US010145280B2

(12) United States Patent
Hatakeyama

(10) Patent No.: US 10,145,280 B2
(45) Date of Patent: Dec. 4, 2018

(54) EXHAUST GAS PURIFYING DEVICE OF INTERNAL-COMBUSTION ENGINE, AND METHOD OF MANUFACTURING SAME

(71) Applicant: HONDA MOTOR CO., LTD., Tokyo (JP)

(72) Inventor: Yoshiaki Hatakeyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/532,624

(22) PCT Filed: Nov. 11, 2015

(86) PCT No.: PCT/JP2015/081785
§ 371 (c)(1),
(2) Date: Jun. 2, 2017

(87) PCT Pub. No.: WO2016/088523
PCT Pub. Date: Jun. 9, 2016

(65) Prior Publication Data
US 2018/0003094 A1    Jan. 4, 2018

(30) Foreign Application Priority Data

Dec. 4, 2014 (JP) .............................. 2014-245791
May 12, 2015 (JP) .............................. 2015-097534

(51) Int. Cl.
*B01D 46/00* (2006.01)
*F01N 3/022* (2006.01)
(Continued)

(52) U.S. Cl.
CPC ....... *F01N 3/0222* (2013.01); *B01D 46/2422* (2013.01); *B01D 46/2455* (2013.01);
(Continued)

(58) Field of Classification Search
CPC .......... F01N 3/0222; F01N 3/28; F01N 3/035; B01D 46/2422; B01D 2265/06
(Continued)

(56) References Cited

U.S. PATENT DOCUMENTS 3,801,289 A * 4/1974 Wiley ................... F01N 3/2853
422/179
3,929,420 A * 12/1975 Wood .................... F01N 3/2828
422/171
(Continued)

FOREIGN PATENT DOCUMENTS

FR    2936009 A1    3/2010
JP    62-162329    10/1987
(Continued)

OTHER PUBLICATIONS

International Search Report dated Feb. 2, 2016, issued in counterpart International Application No. PCT/JP2015/081785 (2 pages).

Primary Examiner — Tom P Duong
(74) Attorney, Agent, or Firm — Westerman, Hattori, Daniels & Adrian, LLP

(57) ABSTRACT

An exhaust gas purifying device includes: a columnar honeycomb carrier in which a plurality of cells which extend from an exhaust gas inflow side to an outflow side, and which serve as exhaust gas flow paths, are demarcated and formed by means of porous separating walls, a three-way catalyst supported in the honeycomb carrier, and a cylindrical case member in which the honeycomb carrier is housed, with the interposition of a retaining member. The honeycomb carrier includes outer circumferential plugging portions formed in such a way as to plug, to a prescribed depth, openings of cells in an outer circumferential portion of at least one end surface of the two end surfaces, in the central axis X-direction, of the honeycomb carrier, and inclined portions formed in a direction whereby the length, in the
(Continued)

central axis X-direction, of the outer circumferential plugging portions decreases toward the outer circumferential edge.

17 Claims, 17 Drawing Sheets

(51) Int. Cl.
    *B01J 35/04*     (2006.01)
    *F01N 3/28*     (2006.01)
    *F01N 3/035*     (2006.01)
    *B01D 46/24*     (2006.01)
    *B01D 53/94*     (2006.01)

(52) U.S. Cl.
    CPC ..... *B01D 46/2459* (2013.01); *B01D 53/9454* (2013.01); *B01J 35/04* (2013.01); *F01N 3/022* (2013.01); *F01N 3/035* (2013.01); *F01N 3/28* (2013.01); *B01D 2255/905* (2013.01); *B01D 2255/9155* (2013.01); *B01D 2258/012* (2013.01); *B01D 2265/06* (2013.01); *B01D 2279/30* (2013.01); *F01N 2330/32* (2013.01); *F01N 2330/48* (2013.01)

(58) Field of Classification Search
    USPC .................................. 422/171, 177, 179, 180
    See application file for complete search history.

(56) References Cited

U.S. PATENT DOCUMENTS

| | | | | |
|---|---|---|---|---|
| 5,219,667 | A * | 6/1993 | Hampton | B01J 35/04 |
| | | | | 29/890 |
| 6,338,826 | B2 * | 1/2002 | Yamada | B01D 53/94 |
| | | | | 422/171 |
| 6,685,888 | B1 * | 2/2004 | Shibata | F01N 3/2867 |
| | | | | 422/179 |
| 6,713,025 | B1 * | 3/2004 | Ivanescu | B01D 53/9454 |
| | | | | 422/177 |
| 6,776,689 | B2 * | 8/2004 | Eichelberger | B01D 53/885 |
| | | | | 451/541 |
| 8,092,749 | B2 * | 1/2012 | Wirth | F01N 3/0211 |
| | | | | 422/180 |
| 9,089,992 | B2 * | 7/2015 | Dorney | B28B 7/0085 |
| 2006/0165956 | A1 * | 7/2006 | Souda | B28B 11/12 |
| | | | | 428/116 |
| 2010/0058725 | A1 | 3/2010 | Konomi et al. | |
| 2014/0087128 | A1 | 3/2014 | Yanase et al. | |

FOREIGN PATENT DOCUMENTS

| | | |
|---|---|---|
| JP | 2008-88952 A | 4/2008 |
| JP | 2010-184218 A | 8/2010 |
| JP | 2010-234332 A | 10/2010 |
| JP | 5053224 B2 | 10/2012 |
| JP | 2013-144954 A | 7/2013 |
| JP | 2014-64978 A | 4/2014 |
| WO | 2008/078716 A1 | 7/2008 |

* cited by examiner

EXHAUST GAS PURIFYING DEVICE OF INTERNAL-COMBUSTION ENGINE, AND METHOD OF MANUFACTURING SAME

TECHNICAL FIELD

The present invention relates to an exhaust gas purifying device of an internal-combustion engine, and a method of manufacturing the same.

BACKGROUND ART

Conventionally, an exhaust gas purifying device provided in the exhaust passage of an internal-combustion engine is configured to include a honeycomb carrier on which an exhaust gas purifying catalyst is loaded, and a cylindrical case member that houses this honeycomb carrier. Upon housing the honeycomb carrier within the case member, it is important to reliably retain the honeycomb carrier within the case member.

As technology for retaining the honeycomb carrier within the case member, technology using mesh ring, etc. is common. In addition, technology that provides a convex part projecting to an outer side in the radial direction to at least a part of an outer circumferential side of the honeycomb carrier has been known (for example, refer to Patent Documents 1 to 3). According to this technology, it is possible to reliably retain the honeycomb carrier within the case member without using a component such as a mesh ring, by the convex part functioning as a locking part.

Patent Document 1: Japanese Patent No. 5053224
Patent Document 2: Japanese Unexamined Patent Application, Publication No. 2013-144954
Patent Document 3: Japanese Unexamined Patent Application, Publication No. 2014-064978

DISCLOSURE OF THE INVENTION

Problems to be Solved by the Invention

However, the honeycomb carriers of Patent Documents 1 to 3 have segment structures consisting of silicon carbide (hereinafter referred to as "SiC"), and are produced as follows. First, a plurality of quadrangular rod-shaped segments consisting of SiC is combined to make into an assembly. Next, by grinding the outer circumferential side thereof, it is shaped into a circular column shape having a convex part at the outer circumferential side. Subsequently, in order to prevent catalyst leakage from the outer circumferential side in the catalyst loading process or an exhaust leak from the outer circumferential side during use, a shell is famed by applying a coating agent to the outer circumferential side thereof. The honeycomb carriers of Patent Documents 1 to 3 are thereby obtained.

However, the honeycomb carriers of Patent Documents 1 to 3 have relatively complex structures having convex parts at the outer circumferential sides thereof, and thus there are problems in that the grinding work in the grinding step thereof is complicated, and the manufacturing cost rises.

In addition, a honeycomb carrier consisting of cordierite (hereinafter referred to as "Cd") which is often used along with SiC is obtained by integrally molding by extrusion molding, followed by firing. The shell is famed at the same time during firing. Therefore, when applying the technology of Patent Document 1 to a honeycomb carrier consisting of Cd, since the outer circumferential side on which a shell is already formed will be ground, the necessity to form the shell again after grinding arises, and thus the production cost increases.

The present invention has been made taking account of the above, and an object thereof is to provide an exhaust gas purifying device of an internal-combustion engine that can reliably retain a honeycomb carrier within a case member with a low-cost and simple structure, and a method of manufacturing the same.

Means for Solving the Problems

In order to achieve the above-mentioned object, the present invention provides an exhaust gas purifying device (for example, the exhaust gas purifying device 1 described later) that is provided in an exhaust passage (for example, the exhaust pipe described later) of an internal-combustion engine (for example, the gasoline engine described later), and purifies exhaust gas of the internal-combustion engine, the device including: a honeycomb carrier (for example, the honeycomb carrier 11 described later) of columnar shape in which a plurality of cells extending from an exhaust gas inlet side end face (for example, the end face 110a in the center axis X direction described later) until an outlet side end face (for example, the end face 110b in the center axis X direction described later) to form flow paths of exhaust gas are demarcated and formed by porous separating walls; an exhaust gas purifying catalyst (for example, the three-way catalyst described later) that is loaded on the honeycomb carrier; and a cylindrical case member (for example, the case member 12 described later) that houses the honeycomb carrier via a retaining member (for example, the retaining member 13 described later), in which the honeycomb carrier includes an outer circumferential sealed part (for example, the outer circumferential sealed parts 111a, 111b described later) in which openings (for example, the openings Ca, Cb described later) of cells at an outer circumferential part (for example, the radial-direction outer circumferential part P described later) of at least one end face among both end faces in a center axis (for example, the center axis X described later) direction thereof are formed to be sealed to a predetermined depth (for example, the predetermined depth D1 described later), and a sloped part (for example, the sloped parts 112a, 112b described later) or stepped part famed in a direction in which the length in the center axis direction of the outer circumferential sealed part becomes smaller as approaching an outer circumferential edge side thereof, and the honeycomb carrier is retained inside the case member by the sloped part or the stepped part in at least one end face catching on an inner wall of the case member via the retaining member.

In the present invention, the outer circumferential sealed parts are famed by sealing the openings of cells in the outer circumferential part of at least one end face among both end faces in the center axis direction of the honeycomb carrier to a predetermined depth. In addition, the sloped parts or stepped parts are formed in a direction in which the length in the center axis direction of this outer circumferential sealed part becomes smaller as approaching the outer circumferential edge side thereof. Furthermore, the honeycomb carrier is retained in the case member by the sloped part or stepped part of at least one end face catching against the inner walls of the case member via the retaining member. It is thereby possible to reliably retain the honeycomb carrier within the case member without using components such as a mesh ring, by a simply structure such that provides the sloped parts or stepped parts to the outer circumferential sealed parts of the honeycomb carrier, and catches the sloped parts or stepped parts against the inner walls of the case member. In other words, since there is no need to form a convex part by cutting the outer circumferential side as is conventionally, the manufacturing process is simplified, and the manufacturing costs can be reduced. In particular, in the case of using the honeycomb carrier consisting of cordierite, since there is no longer a need to form the shell again, the manufacturing process is further simplified, and the manufacturing cost can be further reduced. In addition, in this case, since the sloped parts or stepped parts are formed within the sealed outer circumferential sealed parts, it is possible to reliably prevent catalyst leakage from the outer circumferential side in the catalyst loading step, and exhaust leakage from the outer circumferential side during use.

It is preferable for the honeycomb carrier to be a filter (for example, the GPF described later) having a wall-flow part (for example, the wall-flow part W described later) in which openings of cells in a central part (for example, the radial-direction central part C described later) of both end faces in the center axis direction thereof are alternately sealed, and a cell having an opening on an exhaust inlet side sealed and a cell having an opening on the outlet side sealed are alternately adjacent, and a sealing depth of the outer circumferential sealed part to be deeper than a sealing depth of the central part.

With the present invention, a filter having the wall-flow part at the radial-direction central part that is orthogonal to the center axis direction thereof is used as the honeycomb carrier. In addition, the sealing depth of the outer circumferential sealed parts is made deeper than the sealing depth of the central part (i.e. wall-flow part). Even if a filter for which the pressure loss due to sealing is great and retaining within the case member is difficult, since it is thereby possible to form the sloped parts or stepped parts in the outer circumferential sealed parts having sufficient sealing depth, the filter can be reliably retained within the case member without the addition of extra components or complicated machining.

It is preferable for the honeycomb carrier (for example, the honeycomb carrier 51 described later) to be a filter having a wall-flow part (for example, the wall-flow part W described later) in which openings of cells in a central part (for example, the radial-direction central part C described later) of both end faces in the center axis direction thereof are alternately sealed, and a cell having an opening on an exhaust inlet side sealed and a cell having an opening on the outlet side sealed are alternately adjacent, an end face (for example, the end face 513a described later) on an inner side in the center axis direction of sealing of the outer circumferential sealed part, and an end face (for example, the end face 514a described later) on an inner side in the center axis direction of sealing of a central part of the one end face (for example, the one end face 510a described later) to have substantially the same position in the center axis direction, and a sealing depth of a central part of the other end face (for example, the other end face 510b described later) in the center axis direction to be shorter than a sealing depth of a central part at the one end face.

In the present invention, a filter having a wall-flow part at the radial-direction central part that is orthogonal to the center axis direction thereof is used as the honeycomb carrier. In addition, the end face on the center axis direction inner side of sealing of the outer circumferential sealed part and the end face on the center axis direction inner side of sealing of the central part at the one end face are famed so that the positions in the center axis direction become substantially the same. Furthermore, the sealing depth of the central part at the other end face in the center axis direction is made shorter than the sealing depth of the central part at the one end face. Herein, in the case of forming the sloped parts by grinding or cutting a part of the outer circumferential sealed part, it is necessary to ensure a sealing depth of the outer circumferential sealed part of a certain size, and thus requires a complex step in order to lengthen the sealing depth of only the outer circumferential sealed part. On the other hand, if also lengthening the sealing depth of the radial-direction central part in accordance with the sealing depth of the outer circumferential sealing by way of simplifying the sealing step to one-time sealing, the required filter volume can no longer be ensured and leads to pressure loss. In contrast, according to the present invention, even in a case of the positions of each end face on the center axis direction inner side of both parts being substantially equal by simultaneously sealing the outer circumferential sealed part and the radial-direction central part by sealing one time (i.e. case of the sealing depths of both parts being equal), it is possible to maintain sealing by forming the sloped part or stepped part in the radial-direction outer circumferential part at the one end face of long sealing depth, and the outer circumferential sealed part can be famed. Therefore, it is possible to cut the workload of the sealing step, and thus the manufacturing cost can be reduced. In addition, by shortening the sealing depth of the other end face, it is possible to ensure the filter volume, and worsening of the pressure loss can be avoided.

It is preferable for the honeycomb carrier (for example, the honeycomb carrier 41 described later) to be a filter having a wall-flow part (for example, the wall-flow part W described later) in which an opening area of cells in the outer circumferential sealed part is smaller than an opening area of cells at a central part of the one end face, the openings of cells at the central part (for example, the radial-direction central part C described later) of both end faces in the center axis direction thereof are alternately sealed, and a cell having an opening on the exhaust gas inlet side sealed and a cell having an opening on the outlet side sealed are alternately adjacent, and the end face (for example, the end face 413a described later) at an inner side in the center axis direction of sealing of the outer circumferential sealed part has a position in the center axis direction that is arranged more to the inner side in the center axis direction than the end face (for example, the end face 414a described later) at an inner side in the center axis direction of sealing of the central part of the one end face.

With the present invention, a filter having a wall-flow part at the radial-direction central part that is orthogonal to the center axis direction thereof is used as the honeycomb carrier, and the opening area of cells in the outer circumferential sealed parts is formed to be smaller than the opening area of cells in the central part. In addition, the end faces at the center axis direction inner side of sealing of the outer circumferential sealed parts are arranged so as to have a position in the center axis direction located more to the inner side in the center axis direction than the end faces at the center axis direction inner side of sealing of the central part. In other words, the sealing depth of the outer circumferential sealed parts is made deeper than the sealing depth of the central part. According to the present invention, since the opening area of cells in the outer circumferential sealed parts is smaller than the opening area of cells in the central part, it is possible to produce a structure in which the sealing depth of the outer circumferential sealed parts is deeper than the central part in a one-time sealing step, by way of the capillary phenomenon upon pouring sealing agent into the cells in the sealing step. In other words, it is possible to sufficiently ensure the sealing depth of the outer circumferential sealed parts in which the sloped parts or stepped parts are formed by grinding or cutting, without requiring a complicated process, and thus the manufacturing cost can be reduced. In addition, since the thickness of the separating wall between adjacent cells can be made thicker from the outer circumferential sealed parts having a smaller opening area of cells, it is possible to improve the mechanical strength of the outer circumferential part, and thus damage to the outer edge part, etc. of the honeycomb carrier can be suppressed.

It is preferable for the exhaust gas purifying catalyst to be loaded only on the wall-flow part.

With the present invention, the exhaust gas purifying catalyst is loaded only on the wall-flow part. In other words, the exhaust gas purifying catalyst is not loaded on the outer circumferential sealed parts. It is thereby possible to avoid wasteful loading of the exhaust gas purifying catalyst by not loading the exhaust gas purifying catalyst on the radial-direction outer circumferential part through which exhaust gas hardly flows, and thus the manufacturing cost can be further reduced.

It is preferable for the honeycomb carrier (for example, the honeycomb carrier 61 described later) to be a filter having a wall-flow part (for example, the wall-flow parts W1, W2 described later) in which openings of cells at both end faces in the center axis direction thereof are alternately sealed, and a cell having an opening on an exhaust gas inlet side sealed and a cell having an opening on an outlet side sealed are alternately adjacent; the honeycomb carrier to include an outer circumferential sealed part in which openings of cells in an outer circumferential part of both end faces in the center axis direction thereof are formed to be alternately sealed to a predetermined depth, and a sloped part or stepped part (for example, the sloped parts 612a, 612b described later) famed in a direction in which the length in the center axis direction of the outer circumferential sealed part becomes smaller as approaching an outer circumferential edge side thereof; the honeycomb carrier to be retained within the case member (for example, the case member 12 described later) by the sloped part or stepped part (for example, the sloped part 612b described later) of the end face on the exhaust gas outlet side catching against an inner wall of the case member via the retaining member (for example, the retaining member 13 described later); and the retaining member to not be interposed between the case member and the sloped part or stepped part (for example, the sloped part 612a described later) at the end face on the exhaust gas inlet side.

With the present invention, a filter having a wall-flow part at the central part and the outer circumferential part in the radial direction which is orthogonal to the center axis direction thereof is used as the honeycomb carrier, and an exhaust gas purifying device is famed by interposing the retaining member between the case member and the sloped parts of the exhaust gas outlet side end face of the honeycomb carrier, without interposing between the case member and the sloped part at the exhaust gas inlet side end face of the honeycomb carrier. In addition, the honeycomb carrier is retained inside the case member by the sloped part on the exhaust gas outlet side interposed by the retaining member, by configuring so as to catch on the inner walls of the case sloped parts of the case member via the protection member. Since the retaining member is not interposed between the case member at the sloped part at the exhaust gas inlet side (upstream side) end face, the exhaust gas tends to influx at the wall-flow part of the radial-direction outer circumferential part, and particulate matter (PM) and ash is preferentially collected. Herein, if particulate matter (PM) and ash deposit within the honeycomb carrier, it leads to a decline in the exhaust gas purifying function due to an increase in pressure loss and plugging of the exhaust gas purifying catalyst, and causes the lifespan of the exhaust gas purifying device to decline. In particular, it is a problem since ash continuously deposits without combusting. In contrast, according to the present invention, it is possible to effectively apply the wall-flow part at the radial-direction outer circumferential part as a collection part having a function of preferentially collecting particulate matter (PM) and ash. In addition, after particulate matter (PM) and ash deposit on the wall-flow part in the radial-direction outer circumferential part and pressure loss increases, the exhaust gas flows into the wall-flow part in the radial-direction central part, the particulate matter (PM) and ash are collected, and the exhaust gas is purified by the three-way purifying catalyst; therefore, an exhaust gas purifying device of long lifespan is obtained.

It is preferable for the exhaust gas purifying catalyst to be loaded more abundantly on a wall-flow part (for example, the wall-flow part W1 described later) at the central part in the center axis direction of the honeycomb carrier (for example, the honeycomb carrier 61 described later) than a wall-flow part (for example, the wall-flow part W2 described later) at the outer circumferential part in the center axis direction of the honeycomb carrier.

With the present invention, the exhaust gas purifying catalyst is more abundantly loaded on the wall-flow part in the inner circumferential part in the center axis direction, than the wall-flow part in the outer circumferential part in the center axis direction of the honeycomb carrier.

According to the present invention, by decreasing the three-way catalyst amount loaded on the wall-flow part in the radial-direction outer circumferential part, since the pressure loss of the wall-flow part becomes less, particulate matter (PM) and ash are more preferentially collected on the wall-flow part in the radial-direction outer circumferential part. Therefore, the function as a collection part of the wall-flow part in the radial-direction outer circumferential part is more reliably exhibited. In addition, since the wall-flow part in the radial-direction outer circumferential part mainly has a function as a collection part as mentioned earlier, the exhaust gas purifying function of the exhaust gas purifying device overall is almost unchanged even when setting the loading amount of three-way catalyst to be small. Therefore, by decreasing the three-way catalyst amount loaded on the wall-flow part in the radial-direction outer circumferential part, it is possible to avoid wasteful loading of exhaust gas purifying catalyst, and thus the manufacturing cost can be curbed.

It is preferable for the honeycomb carrier (for example, the honeycomb carrier 71 described later) is a filter having a wall-flow part (for example, the wall-flow parts W1, W2 described later) in which openings of cells at both end faces in the center axis direction thereof are alternately sealed, and a cell having an opening on an exhaust gas inlet side sealed and a cell having an opening on an outlet side sealed are alternately adjacent; the honeycomb carrier to include an outer circumferential sealed part in which openings of cells in an outer circumferential part of both end faces in the center axis direction thereof are famed to be alternately sealed to a predetermined depth, and a sloped part or stepped part (for example, the sloped parts 712a, 712b described later) famed in a direction in which the length in the center axis direction of the outer circumferential sealed part becomes smaller as approaching an outer circumferential edge side thereof; the honeycomb carrier to be retained within the case member by the sloped part or stepped part (for example, the sloped part 712a described later) of the end face on the exhaust gas inlet side catching against an inner wall of the case member via the retaining member; and the retaining member to not be interposed between the case member and the sloped part or stepped part (for example, the sloped part 712b described later) at the end face on the exhaust gas outlet side.

With the present invention, a filter having a wall-flow part at the central part and the outer circumferential part in the radial direction which is orthogonal to the center axis direction thereof is used as the honeycomb carrier, and an exhaust gas purifying device is famed by interposing the retaining member between the case member and the sloped part at the exhaust gas inlet side end face of the honeycomb carrier, without interposing between the case member and the sloped parts of the exhaust gas outlet side end face of the honeycomb carrier. In addition, the honeycomb carrier is retained inside the case member by the sloped part on the exhaust gas inlet side interposed by the retaining member, by configuring so as to catch on the inner walls of the case sloped parts of the case member via the protection member. Since the retaining member is interposed between the case member at the sloped part at the exhaust gas inlet side (upstream side) end face, particulate matter (PM) and ash will not influx into the wall-flow part in the radial-direction outer circumferential part. In addition, since the retaining member is not interposed between the case member at the sloped part on the downstream side, exhaust gas tends to discharge to the downstream side from the wall-flow part in the radial-direction outer circumferential part. Herein, when particulate matter (PM) and ash deposit within the honeycomb carrier, it leads to a decline in the exhaust gas purifying function due to an increase in pressure loss and plugging of the three-way catalyst, and thus causes the lifespan of the exhaust gas purifying device to decline. In particular, it is a problem since ash continuously deposits without combusting. In contrast, according to the present invention, three-way catalyst of equivalent amount to the wall-flow part in the radial-direction central part is loaded on the wall-flow part in the radial-direction outer circumferential part, and particulate matter (PM) and ash do not influx. Therefore, after particulate matter (PM) and ash deposit on the wall-flow part in the radial-direction central part and the pressure loss increases, the exhaust gas influxes to the wall-flow part in the radial-direction outer circumferential part, and the exhaust tends to be purified by the three-way catalyst loaded, and discharge to the downstream side. Consequently, the decline in exhaust gas purifying function due to an increase in pressure loss and plugging of the three-way catalyst as the exhaust gas purifying device overall is suppressed, and an exhaust gas purifying device of long lifespan is obtained.

It is preferable for the honeycomb carrier (for example, the honeycomb carrier 81 described later) to have a vertical part (for example, the vertical parts 813a, 813b described later) that is perpendicular to both end faces (for example, the end faces 810a, 810b described later) and links the sloped part or stepped part (for example, the sloped parts 812a, 812b described later) with an outer circumferential edge of both end faces in the center axis direction.

With the present invention, the honeycomb carrier is formed by providing a vertical part that links the sloped parts or stepped parts with the outer circumferential edges of both end faces in the center axis direction, and is perpendicular to both end faces. According to the present invention, positioning of the retaining member becomes easy. In other words, jutting out of the retaining member to the radial-direction central part, and the interposing of the radial-direction outer circumferential part by the retaining member becoming insufficient can be reliably prevented. Therefore, a more reliable exhaust gas purifying function is obtained.

It is preferable for the sloped part or stepped part to be formed by grinding or cutting a part of the outer circumferential sealed part.

With the present invention, the sloped parts or stepped parts are famed by grinding or cutting a part of the outer circumferential sealed part. Since it is thereby possible to reliably form sloped parts or stepped parts within the outer circumferential sealed part, it is possible to reliably prevent catalyst leakage from the outer circumferential side in the catalyst loading step, and exhaust leakage from the outer circumferential side during use.

It is preferable for the case member to include: a case sloped part (for example, the case sloped parts 92a, 92b, 102a, 102b described later) or a case stepped part that is formed to follow the sloped part or stepped part of the honeycomb carrier, and a convex part (for example, the convex parts 92c, 92c described later) that is famed in a vicinity of the case sloped part or the case stepped part, and an interior thereof projects towards an outer side.

Incidentally, a case member having the case sloped parts or case stepped parts (hereinafter simply referred to as case stepped parts) is produced in the following way, for example. First, the honeycomb carrier around which the retaining member is wrapped over the entirety of the outer circumferential-side face is inserted into the cylindrical case member prior to forming the case sloped parts. Next, by reducing the diameter of both ends in the center axis direction of the case member by pressing from the outer circumferential side thereof by press molding, the case sloped parts are formed. The case member having the case sloped parts is thereby produced.

Herein, in press molding performed upon forming the case sloped parts, since the case member is a cylindrical shape, it is not possible to push the press die only from the exterior side against the case member, i.e. only from one side. For this reason, conventionally, the case member cannot sufficiently follow the die surface of the press die, and in particular, shaping of an R part or the like is difficult, and thus high molding precision of the case member parts is not obtained. In addition, since the case sloped parts do not become shapes that adequately follow the shape of the sloped parts of the honeycomb carrier, there is concern over the retaining of the honeycomb member being insufficient. In addition, there is concern over wrinkles generating in the case sloped parts by the flow of material being biased at the periphery of the case sloped parts (material aggregating). Furthermore, wrinkles generate also in the retaining member at the periphery of these sloped parts, and the surface pressure of the retaining member on the honeycomb carrier becomes excessive, a result of which there is concern over the honeycomb carrier being damaged.

Therefore, with the present invention, by forming the convex parts in which the interior thereof projects to the outer side in the vicinity of the case sloped parts, the material that flows during press molding is intentionally guided to the convex parts. By intentionally forming the convex parts, in the vicinity of the case sloped parts which do not influence the retaining function of the honeycomb carrier, it is possible to avoid wrinkles, etc. from generating in the case sloped parts, and thus high molding (dimensional) precision of the case sloped parts is obtained, a result of which it is made possible to resolve the above-mentioned defects.

In addition, the present invention provides a method of manufacturing an exhaust gas purifying device of an internal-combustion engine, the method comprising the steps of: sealing (for example, the sealing step described later) to form, in a columnar honeycomb carrier in which a plurality of cells forming flow paths of exhaust gas that extend from an exhaust gas inlet side end face until an outlet side end face are demarcated and famed by porous separating walls, an outer circumferential sealed part by sealing openings of cells in an outer circumferential part of at least one end face among both end faces in a center axis direction thereof to a predetermined depth; machining (for example, the machining step described later) to form a sloped part or a stepped part in a direction in which a length in the center axis direction of the outer circumferential sealed part becomes smaller as approaching an outer circumferential edge side thereof, by grinding or cutting a part of the outer circumferential sealed part; catalyst loading (for example, the catalyst loading step describe later) to load an exhaust gas purifying catalyst onto the honeycomb carrier in which the sloped part or the stepped part was famed; and housing (for example, the housing step described later) the honeycomb carrier on which the exhaust gas purifying catalyst was loaded within the case member so as to be retained by the sloped part or the stepped part catching against an inner wall of a cylindrical case member via a retaining member.

It is preferable for the honeycomb carrier to be further made into a filter having a wall-flow part in which a cell having an opening on an exhaust gas inlet side sealed and a cell having an opening on an outlet side sealed are adjacent, by alternately sealing openings of cells in a central part of both end faces in a center axis direction of the honeycomb carrier to a depth shallower than the outer circumferential sealed part, in the step of sealing.

It is preferable for the exhaust gas purifying catalyst is loaded only on the wall-flow part in the step of catalyst loading, by immersing a side of the one end face of the honeycomb carrier into a slurry containing the exhaust gas purifying catalyst in a state sealing an outer circumferential part of the one end face, and then suctioning from a central part of the other end face.

It is preferable for a sealing depth of a central part at the one end face (for example, the one end face 510*a* described later) of the honeycomb carrier (for example, the honeycomb carrier 51 described later) to be made substantially equal to a sealing depth of the outer circumferential sealed part (for example, the outer circumferential sealed part 511*a* described later), and a sealing depth of a central part at the other end face (for example, the other end face 510*b* described later) to be made shorter than a sealing depth of a central part at the one end face, in the step of sealing.

It is preferable for a honeycomb carrier (for example, the honeycomb carrier 41 described later) in which an opening area of cells in the outer circumferential part at both end faces in the center axis direction is smaller than an opening area of cells in a central part thereof is used as the honeycomb carrier, and an end face (for example, the end faces 413*a*, 413*b* described later) on an inner side in the center axis direction of sealing of the outer circumferential sealed part (for example, the outer circumferential sealed parts 411*a*, 411*b* described later) to be sealed so as to be disposed more to the inner side in the center axis direction than an end face (for example, the end faces 414*a*, 414*b* described later) on an inner side in the center axis direction of sealing of the central part at the one end face, in the step of sealing.

It is preferable for a honeycomb carrier on which the exhaust gas purifying catalyst was loaded to be housed in the step of housing so as to be retained within a case member (for example, the case member 92 described later) having a case sloped part (for example, the case sloped parts 92*a*, 92*b* described later) or a case stepped part that follows the sloped part or the stepped part of the honeycomb carrier, and a convex part (for example, the convex part 92*c* described later) that is formed in a vicinity of the case sloped part or the case stepped part and having an interior that projects to an outer side, by the sloped part or the stepped part catching against an inner wall of the case sloped part or the case stepped part via a retaining member.

According to the inventions of these methods of manufacturing, similar effects as each of the aforementioned corresponding exhaust gas purifying devices are exerted.

Effects of the Invention

According to the present invention, it is possible to provide an exhaust gas purifying device of an internal-combustion engine that can reliably retain a honeycomb carrier within a case member with a low-cost and simple structure, and a method of manufacturing the same.

PREFERRED MODE FOR CARRYING OUT THE INVENTION

Hereinafter, a first embodiment of the present invention will be explained in detail while referencing the drawings. It should be noted that, in the explanations of the second embodiment and later, the same reference symbols will be assigned for configurations shared with the first embodiment, as well as assigning reference symbols with the same regularity for corresponding configurations, and explanations of the configurations and effects thereof will be omitted.

First Embodiment

Figure 1:
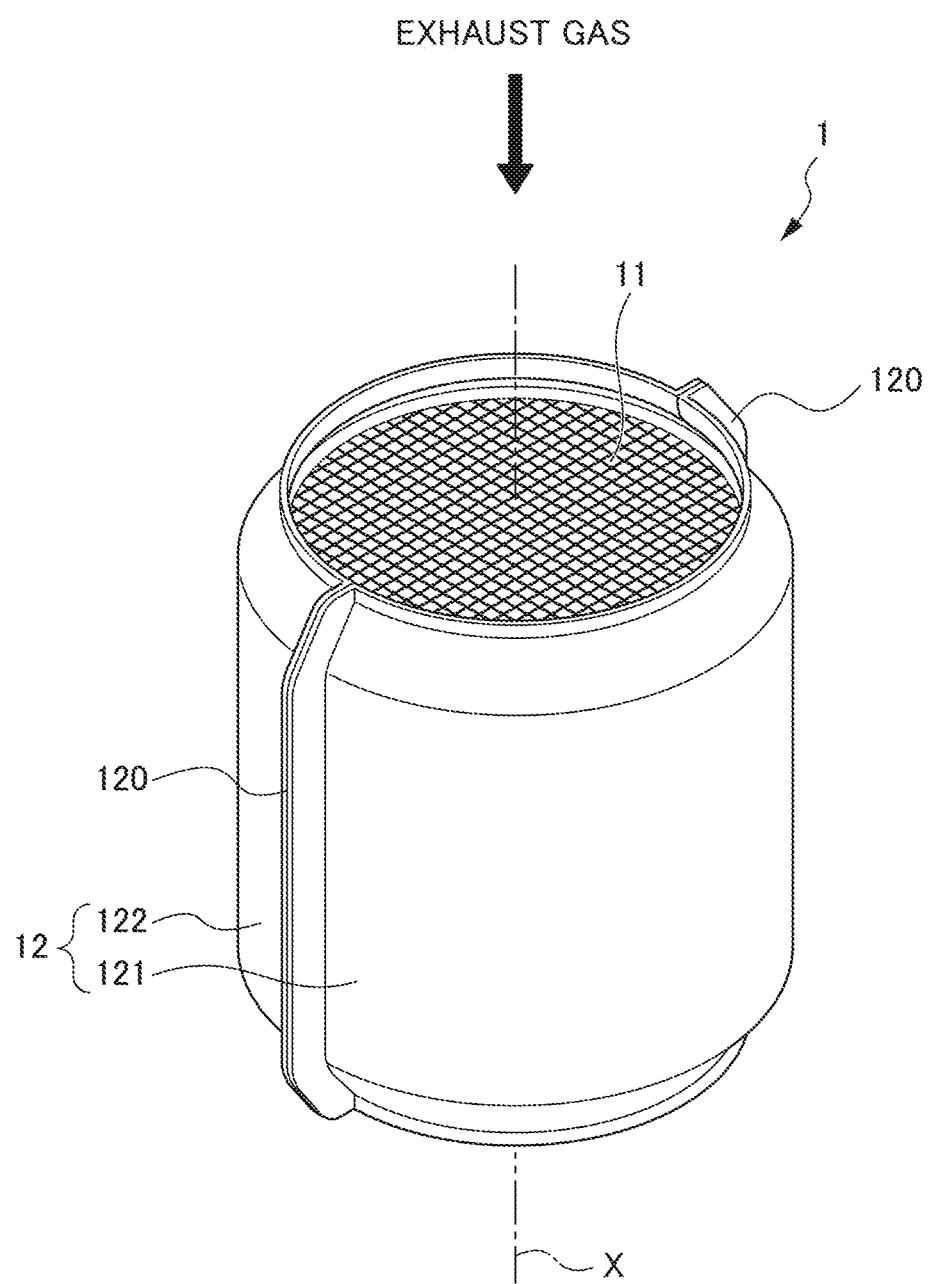
FIG. 1 is a perspective view showing an exhaust gas purifying device of an internal-combustion engine according to a first embodiment of the present invention.

FIG. 1 is a perspective view of an exhaust gas purifying device of an internal-combustion engine according to the first embodiment of the present invention. An exhaust gas purifying device 1 of an internal-combustion engine according to the present embodiment is a gasoline particulate filter (hereinafter referred to as "GPF") that is provided in an exhaust pipe of an internal-combustion engine (hereinafter referred to as "engine") not illustrated, and collects particulate matter (hereinafter referred to as "PM") in the exhaust gas flowing through this exhaust pipe.

The exhaust gas purifying device 1 is provided in an exhaust pipe which extends downwards along a lateral face on a vehicle forward side of this gasoline engine, directly under the gasoline engine, which is not illustrated. In other words, the exhaust gas purifying device 1 is provided in the exhaust pipe in a state orienting the exhaust gas flow direction to downwards. As shown in FIG. 1, the exhaust gas purifying device 1 includes a honeycomb carrier 11 and a case member 12.

The honeycomb carrier 11 has a plurality of cells serving as flow paths of exhaust gas that extend to penetrate from an exhaust gas inlet side end face until an outlet side end face, and porous separating walls that demarcate to form these cells. The honeycomb carrier 11 is a columnar shape having a round cross section. However, it is sufficient so long as the honeycomb carrier is columnar, and the radial cross section may be elliptical or a shape having a plurality of arcs, for example. The shape of each cell is a square column shape having a square cross-section; however, it may be a polygonal column shape, for example.

The honeycomb carrier 11 is formed by porous, fire-resistant ceramic consisting of cordierite. The honeycomb carrier 11 consisting of cordierite is obtained by being integrally molded by extrusion molding as described later, followed by firing. A shell is famed at the same time during firing. Therefore, since the honeycomb carrier 11 of the present embodiment has the outer circumferential side covered by a shell, catalyst will not leak out from the outer circumferential side in the catalyst loading process, and exhaust gas will not leak out from the outer circumferential side during use. For the pore (cavity) size or porosity (cavity ratio) of the honeycomb carrier 11, the separating walls thereof are set as appropriate within a range functioning as a filter media that filters PM in exhaust gas.

The exhaust gas purifying catalyst for purifying exhaust gas is loaded onto the honeycomb carrier 11. More specifically, a three-way catalyst that purifies HC, CO and NOx in the exhaust gas is loaded onto the honeycomb carrier 11 of the present embodiment. As the three-way catalyst, a catalyst containing at least one noble metal among Pt, Pd and Rh is preferably used. It should be noted that a more detailed structure of the honeycomb carrier 11 will be described in detail later.

The case member 12 is cylindrical with a circular ring cross-section, and stores the aforementioned honeycomb carrier 11 inside. However, it is sufficient so long as the case member 12 is tubular according to the shape of the honeycomb carrier 11, and the radial cross-section may be an elliptical ring or a shape having a plurality of arc rings, for example. This case member 12 is configured from metal such as SUS, for example.

The case member 12 is a clam-shell type case member configured from case halves 121, 122 which are divided into two in the circumferential direction along the central axis X direction thereof (vertical direction in FIG. 1). As shown in FIG. 1, the case member 12 is integrally formed by butt welding the two divided case halves 121, 122 with the extension parts 120, 120. It should be noted that extension parts 120, 120 are formed by butt welding parts made into flanges by bending the edge in the circumferential direction of each case half outwards.

Figure 2:
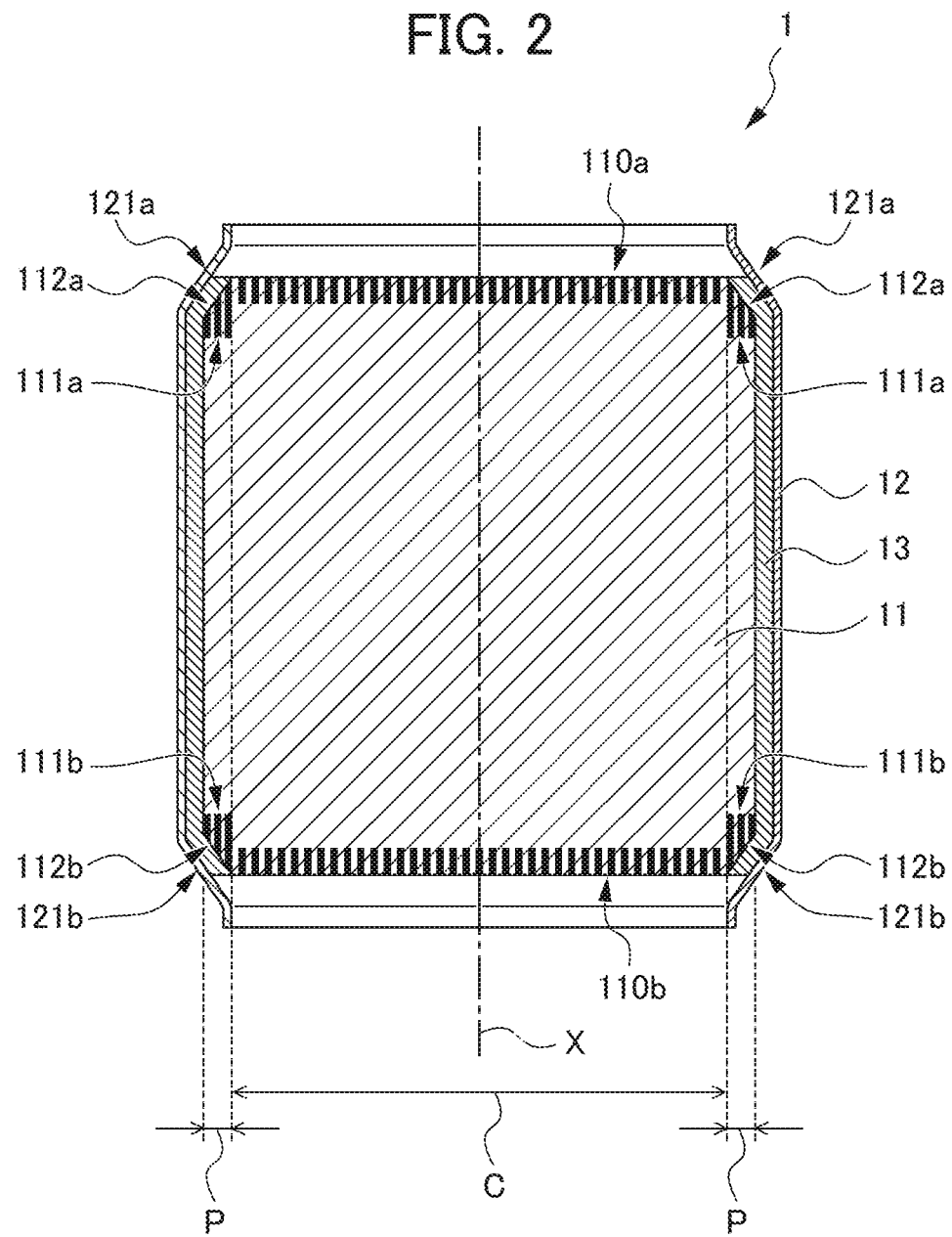
FIG. 2 is an axial-direction cross-sectional view of the exhaust gas purifying device according to the first embodiment of the present invention.

Hereinafter, FIG. 2 is an axial-direction cross-sectional view (cross-sectional view along central axis X direction; same below) of the exhaust gas purifying device 1 according to the present embodiment. As shown in FIG. 2, the honeycomb carrier 11 is housed within the case member 12 via a retaining member 13. In more detail, the honeycomb carrier 11 is housed within the case member 12 in a state in which a mat-like retaining member 13 is wrapped over the entire circumference of the entire outer circumferential side including sloped parts 112a, 112b described later.

In addition, the case member 12 has a shape following the outer profile of the honeycomb carrier 11, and both ends in the center axis direction, i.e. exhaust gas inlet side end and outlet side end, respectively form case sloped parts 121a, 121b which gradually reduce in diameter as approaching towards the ends. For this reason, the housed honeycomb carrier 11 is retained within the case member 12 by the sloped parts 112a, 112b thereof catching on the inner walls of the case sloped parts 121a, 121b of the case member 12 via the retaining member 13.

The retaining member 13 is interposed between the outer circumferential side of the honeycomb carrier 11 and the inner wall of the case member 12, and retains the honeycomb carrier 11 inside of the case member 12. As the retaining member 13, a material having heat resistance, vibration resistance, and sealability is used. More specifically, in addition to alumina fibers, silica fibers, alumina silica fibers, and ceramic fibers such as ceramic glass fiber, a metal mesh, etc. can be used.

Figure 3:
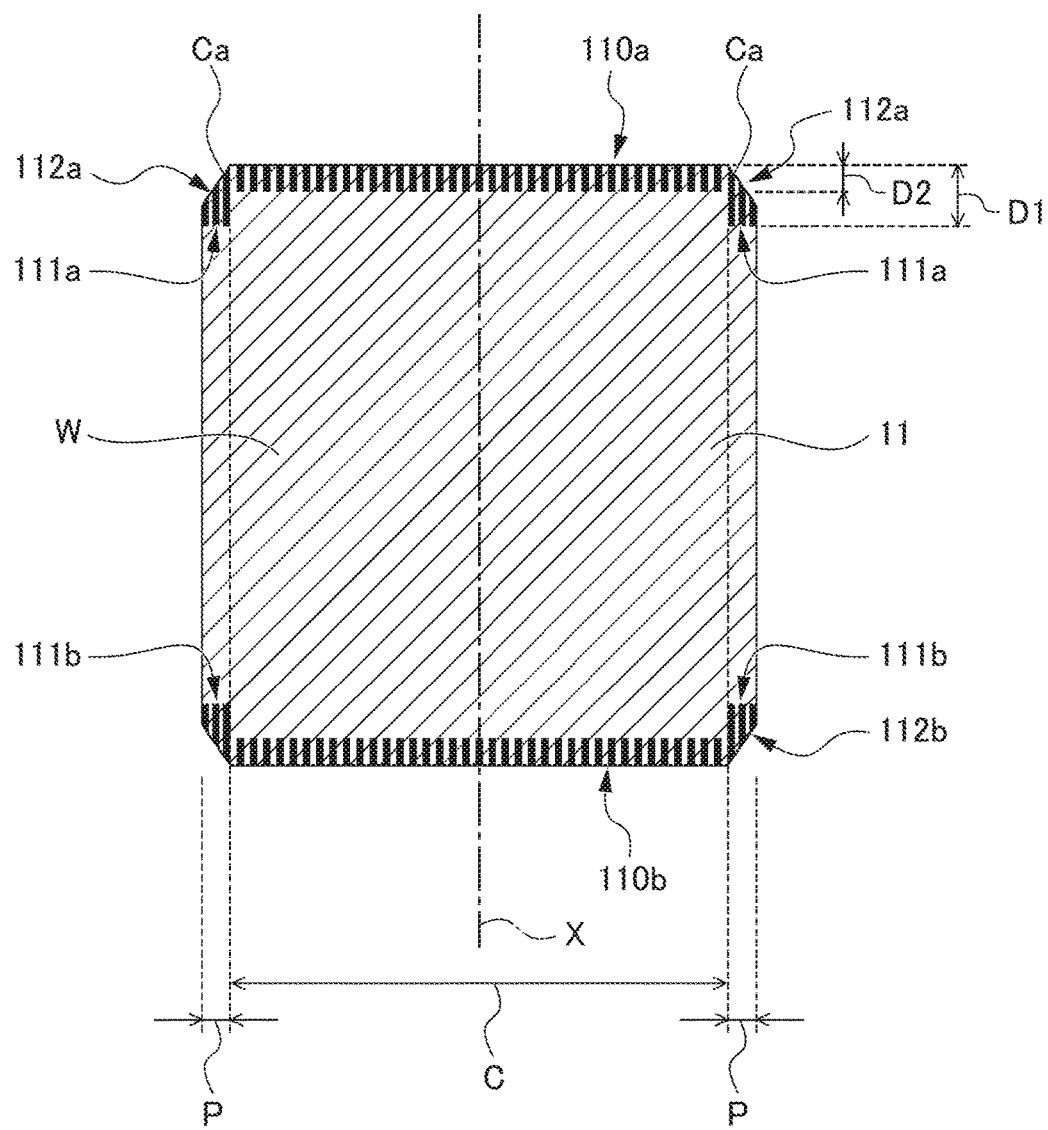
FIG. 3 is an axial-direction cross-sectional view of a honeycomb carrier of the exhaust gas purifying device according to the first embodiment of the present invention.

Next, a more detailed structure of the honeycomb carrier 11 will be explained while referencing FIG. 3. FIG. 3 is an axial-direction cross-sectional view of the honeycomb carrier 11 of the exhaust gas purifying device 1 according to the present embodiment. In FIG. 3, the dark portion indicates a portion sealed by a sealing agent. As shown in FIG. 3, the honeycomb carrier 11 has a characteristic in that the structure of the central part differs from the outer circumferential part in the radial direction thereof (left/right direction in FIG. 1, which is direction orthogonal to the central axis X direction).

More specifically, the honeycomb carrier 11 has outer circumferential sealed parts 111*a*, 111*b* formed by openings Ca, Cb of a plurality of cells at the outer circumferential part (radial-direction outer circumferential part P) of both ends 110*a*, 110*b* in the center axis X direction thereof being sealed a predetermined depth D1 in the center axis X direction. These outer circumferential sealed parts 111*a*, 111*b* are formed over the entire circumference.

The width in the radial direction of these outer circumferential sealed parts 111*a*, 111*b* (radial direction length of radial direction outer circumferential part P) is preferably no more than 10 mm. If the width in the radial direction of the outer circumferential sealed parts 111*a*, 111*b* is no more than 10 mm, the function as a filter of the honeycomb carrier 11 will not be impaired.

In the outer circumferential sealed parts 111*a*, 111*b*, the openings Ca, Cb of a plurality of adjacent cells are alternately sealed. In other words, the outer circumferential sealed parts 111*a*, 111*b* is a wall-flow structure in which a cell having the opening Ca on the exhaust gas inlet side sealed, and a cell having the opening Cb on the outlet side sealed are alternately adjacent in a checked pattern. It should be noted that the outer circumferential sealed parts 111*a*, 111*b* are sealed by a sealing agent similar to the sealing agent of the wall-flow part W in the radial-direction central part C described later. As the sealing agent, a conventional, well-known sealing agent made by mixing cordierite powder, adhesive, etc. is used, for example.

In addition, the honeycomb carrier 11 has sloped parts 112*a*, 112*b* in which sloped planes that slope in a direction in which the length in the center axis X direction of the outer circumferential sealed parts 111*a*, 111*b* becomes smaller as approaching the outer circumferential edge side thereof is formed. These sloped parts 112*a*, 112*b* are famed by grinding a part of the outer circumferential sealed parts 111*a*, 111*b* by way of the method of manufacturing described later.

The length in the center axis X direction of the sloped parts 112*a*, 112*b* is preferably no more than 10 mm. In addition, the width in the radial direction of the sloped parts 112*a*, 112*b* is preferably no more than 30% of the diameter of the honeycomb carrier 11. In addition, the sloping angle of the sloped parts 112*a*, 112*b* is preferably 15 to 80°. By satisfying these conditions, the sloped parts 112*a*, 112*b* will reliably catch on the inner walls of the case sloped parts 121*a*, 121*b* of the case member 12 via the retaining member 13, a result of which the honeycomb carrier 11 is reliably retained within the case member 12.

Here, a sealing depth D1 of the outer circumferential sealed parts 111*a*, 111*b* is set to be deeper than a sealing depth D2 of the radial-direction central part C described later. More specifically, the sealing depth D1 of the outer circumferential sealed parts 111*a*, 111*b* is set to be larger than the distance in the center axis X direction of the sloped parts 112*a*, 112*b* (sloping plane). Forming the sloped parts 112*a*, 112*b* in the outer circumferential sealed parts 111*a*, 111*b* thereby becomes easy.

In addition, in the honeycomb carrier 11, the openings of cells in the central part (radial-direction central part C) at both end faces 110*a*, 110*b* in the center axis X direction are alternately sealed. In other words, the honeycomb carrier 11 is a filter having a wall-flow part W in which cells having the opening on the exhaust gas inlet side sealed and cells having the opening on the outlet side sealed are alternately adjacent in a checked pattern. It should be noted that the sealing depth D1 of the outer circumferential sealed parts 111*a*, 111*b* is set to be deeper than the sealing depth D2 of the radial-direction central part C.

In addition, in the honeycomb carrier 11, the aforementioned three-way catalyst is only loaded on the radial-direction central part C, and the three-way catalyst is not loaded on the radial-direction outer circumferential part P. In other words, the wasteful use of catalyst is avoided by not loading the three-way catalyst on the radial-direction outer circumferential part P through which the exhaust gas hardly flows, and loading the three-way catalyst only on the radial-direction central part C through which exhaust gas mainly flows.

Figure 4:
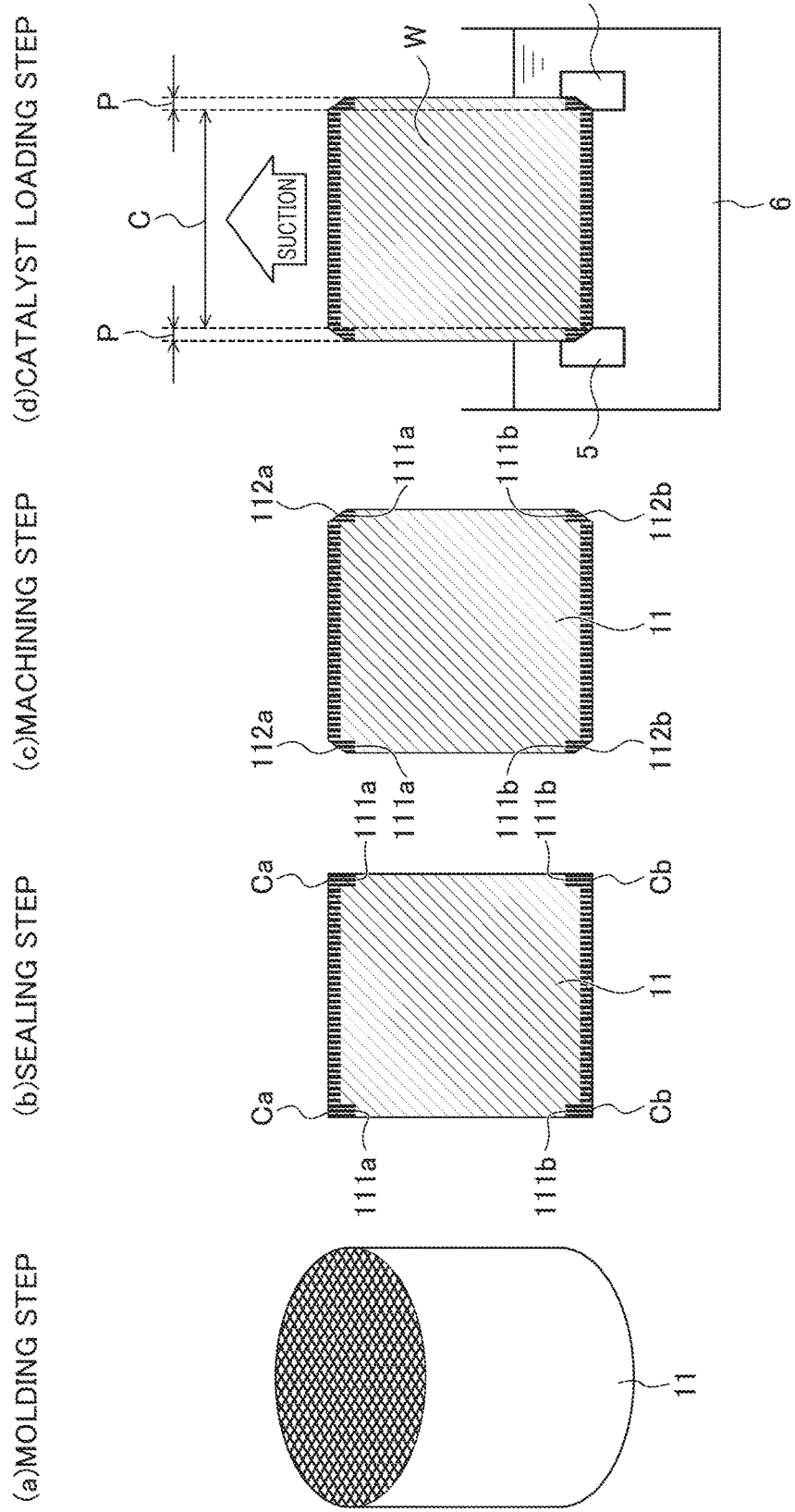
FIG. 4 is a view showing a method of manufacturing the exhaust gas purifying device according to the first embodiment of the present invention.

Next, a method of manufacturing the exhaust gas purifying device 1 according to the present embodiment will be explained while referencing FIG. 4. FIG. 4 is a view showing a method of manufacturing the exhaust gas purifying device 1 according to the present embodiment. As shown in FIG. 4, the method of manufacturing the exhaust gas purifying device 1 according to the present embodiment includes (a) a molding step, (b) a sealing step, (c) a machining step, (d) a catalyst loading step, and a housing step that is not illustrated.

First, in the molding step shown in FIG. 4(*a*), a columnar honeycomb carrier consisting of cordierite is integrally molded by extrusion molding. A honeycomb carrier 11 having a plurality of cells serving as flow paths for exhaust gas extending to penetrate from an exhaust gas inlet side end face until an outlet side end face, and porous separating walls that demarcate to form these cells is thereby obtained.

Next, in the sealing step shown in FIG. 4(*b*), the outer circumferential sealed parts 111*a*, 111*b* are formed in honeycomb carrier 11 molded in the molding step by sealing the openings Ca, Cb of cells in the outer circumferential part (radial-direction outer circumferential part P) at both end faces in the center axis X direction thereof to a predetermined depth D1. At this time, by alternately sealing the openings Ca, Cb of cells, a wall-flow structure in which cells in which the opening Ca on the exhaust gas inlet side is sealed, and cells in which the opening Cb on the outlet side is sealed are alternately adjacent in a checked pattern is formed in the radial-direction outer circumferential part P.

At the same time, in this sealing step, the openings of cells in the central part at both end faces in the center axis X direction of the honeycomb carrier 11 (radial-direction central part C) are alternately sealed at a depth shallower than the outer circumferential sealed parts 111*a*, 111*b*. A wall-flow part W in which cells having the opening on the exhaust gas inlet side sealed, and cells having the opening on the outlet side sealed shallower than the sealing depth of the outer circumferential sealed parts 111*a*, 111*b* are adjacent is thereby formed. In other words, the honeycomb carrier 11 is made into a filter.

It should be noted that, in this sealing step, the aforementioned, conventional, well-known sealing agent is used. As the specific procedure of sealing, a masking in which openings are alternately provided in a checked pattern corresponding to the opening positions of each cell of the honeycomb carrier 11 is first arranged on the end face of the honeycomb carrier 11. Next, the sealing agent is filled to seal inside of the openings of cells alternately in a checked pattern by pouring the sealing agent from above. At this time, the sealing depth is adjusted by adjusting the amount of sealing agent, sealing time, etc.

Next, in the machining step shown in FIG. 4(*c*), by grinding or cutting a part of the outer circumferential sealing parts 111*a*, 111*b* of the honeycomb carrier 11 sealed in the sealing step, the sloped parts 112*a*, 112*b* are formed in a direction in which the length in the center axis X direction of the outer circumferential sealed parts 111*a*, 111*b* becomes shorter as approaching the outer circumferential edge side thereof. As the machining method, cutting is preferably applied from the viewpoint of higher precision machining being possible.

Next, in the catalyst loading step shown in FIG. 4(*d*), the three-way catalyst is loaded on the honeycomb carrier 11 in which the sloped parts 112*a*, 112*d* were formed. In more detail, the three-way catalyst is loaded only on the wall-flow part W of the radial-direction central part C. As the specific procedure, first, the outer circumferential part (radial-direction outer circumferential part P) of one end face in the center axis X direction of the honeycomb carrier 11 is immersed in a slurry 60 containing the three-way catalyst, in a state sealing with clamp sealing members 50, 50. Next, it is suctioned from the radial-direct central part C at the other end face. The three-way catalyst is thereby loaded only on the wall-flow part W.

Next, in the housing step that is not illustrated, the honeycomb carrier 11 on which the three-way catalyst was loaded in the catalyst loading step is housed within a case member 12 by configuring so that the sloped parts 112*a*, 112*b* catch against the inner walls of the case member 12 to be retained via the retaining member 13. The exhaust gas purifying device 1 is manufactured as stated above.

According to the present embodiment, the following effects are exerted. In the present embodiment, the outer circumferential sealed parts 111*a*, 111*b* are formed by sealing the openings Ca, Cb of cells in the radial-direction outer circumferential part P of both end faces 110*a*, 110*b* in the center axis X direction of the honeycomb carrier 11 to a predetermined depth D1. In addition, the sloped parts 112*a*, 112*b* are famed in a direction in which the length in the center axis X direction of this outer circumferential sealed parts 111*a*, 111*b* becomes smaller as approaching the outer circumferential edge side thereof. Furthermore, the honeycomb carrier 11 is retained in the case member 12 by the sloped parts 112*a*, 112*b* catching against the inner walls of the case member 12 via the retaining member 13. It is thereby possible to reliably retain the honeycomb carrier 11 within the case member 12 without using components such as a mesh ring, by a simply structure such that provides the sloped parts 112*a*, 112*b* to the outer circumferential sealed parts 111*a*, 111*b* of the honeycomb carrier 11, and catches the sloped parts 112*a*, 112*b* against the inner walls of the case member 12. In other words, since there is no need to form a convex part by cutting the outer circumferential side as is conventionally, the manufacturing process is simplified, and the manufacturing costs can be reduced. In particular, in the case of using the honeycomb carrier 11 consisting of cordierite, since there is no longer a need to form the shell again, the manufacturing process is further simplified, and the manufacturing cost can be further reduced. In addition, in this case, since the sloped parts 112*a*, 112*b* are famed within the sealed outer circumferential sealed parts 111*a*, 111*b*, it is possible to reliably prevent catalyst leakage from the outer circumferential side in the catalyst loading step, and exhaust leakage from the outer circumferential side during use.

In addition, with the present embodiment, a GPF having the wall-flow part W at the radial-direction central part C that is orthogonal to the center axis X direction thereof is used as the honeycomb carrier 11. In addition, the sealing depth D1 of the outer circumferential sealed parts 111*a*, 111*b* is made deeper than the sealing depth D2 of the radial direction central part C (i.e. wall-flow part W). Even if a GPF for which the pressure loss due to sealing is great and retaining within the case member 12 is difficult, since it is thereby possible to form the sloped parts 112*a*, 112*b* in the outer circumferential sealed parts 111*a*, 111*b* having sufficient sealing depth D1, the GPF can be reliably retained within the case member 12 without the addition of extra components or complicated machining.

In addition, with the present embodiment, the three-way catalyst is loaded only on the wall-flow part W. In other words, the loading of the three-way catalyst on the outer circumferential sealed parts 111*a*, 111*b* is averted. It is thereby possible to avoid wasteful loading of the three-way catalyst by not loading the three-way catalyst on the radial-direction outer circumferential part P through which exhaust gas hardly flows, and thus the manufacturing cost can be further reduced.

In addition, with the present embodiment, the sloped parts 112*a*, 112*b* are famed by grinding parts of the outer circumferential sealed parts 111*a*, 111*b*. Since the sloped parts 112*a*, 112*b* are thereby reliably formed within the outer circumferential sealed parts 111*a*, 111*b*, it is possible to reliably prevent catalyst leakage from the outer circumferential side in the catalyst loading step, and exhaust leakage from the outer circumferential side during use.

In addition, with the present embodiment, the exhaust gas purifying device 1 is manufactured by following a manufacturing method having the molding step, sealing step, machining step, catalyst loading step and housing step as mentioned above. Similar effects as the aforementioned respective effects are thereby exerted.

Second Embodiment

Figure 5:
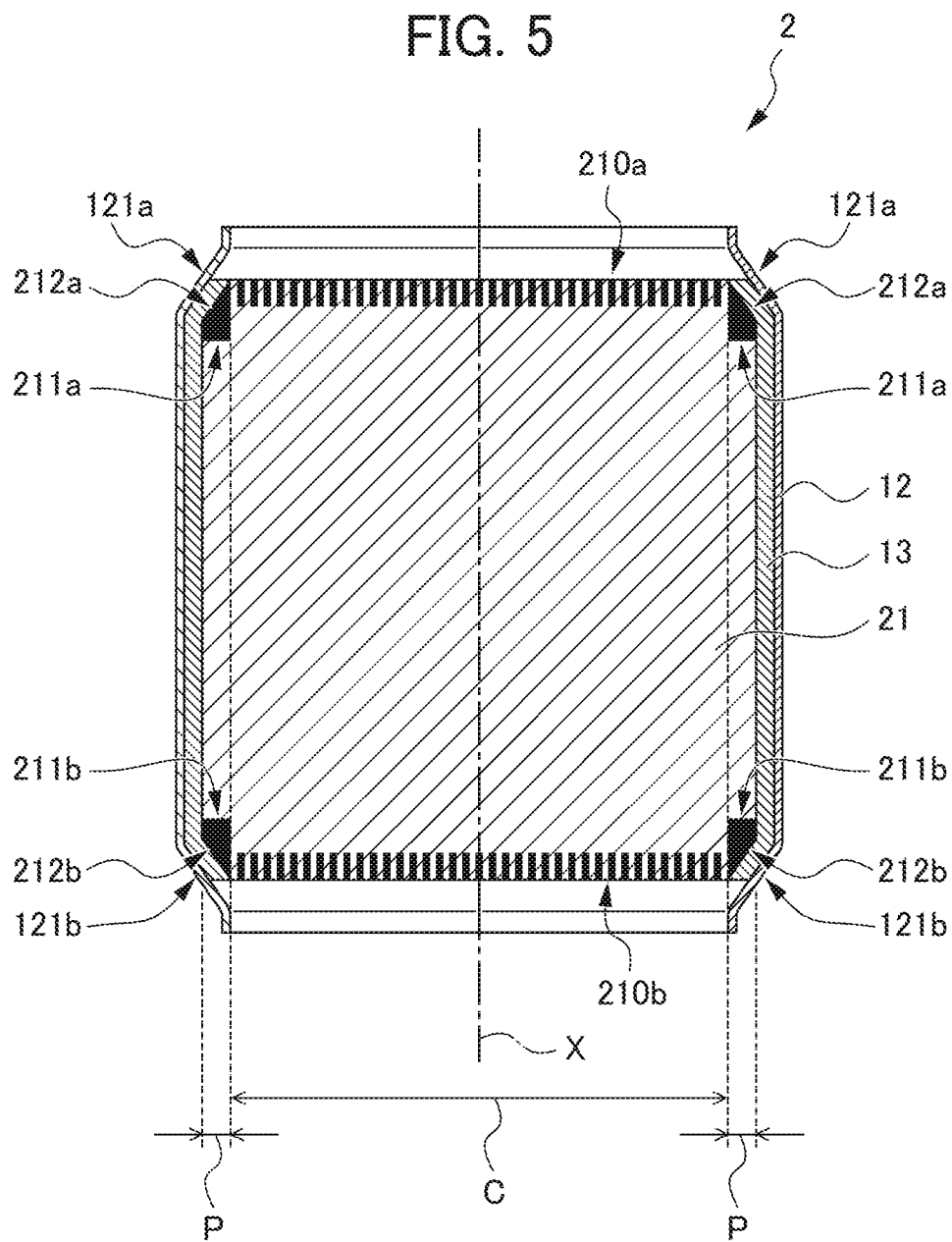
FIG. 5 is an axial-direction cross-sectional view of an exhaust gas purifying device according to a second embodiment of the present invention.

FIG. 5 is an axial-direction cross-sectional view of an exhaust gas purifying device 2 according to a second embodiment of the present invention. As shown in FIG. 5, the exhaust gas purifying device 2 according to the present embodiment is the same configuration compared to the exhaust gas purifying device 1 according to the first embodiment, except for the configuration of outer circumferential sealed parts 211*a*, 211*b* differing.

More specifically, the outer circumferential sealed parts 211*a*, 211*b* of the present embodiment differ from the first embodiment in the point of the openings Ca, Cb of a plurality of cells being completely sealed. In other words, the radial-direction outer circumferential part P of the present embodiment is not a wall-flow structure. According to the present embodiment, similar effects as the effects of the present embodiment are exerted.

Third Embodiment

Figure 6:
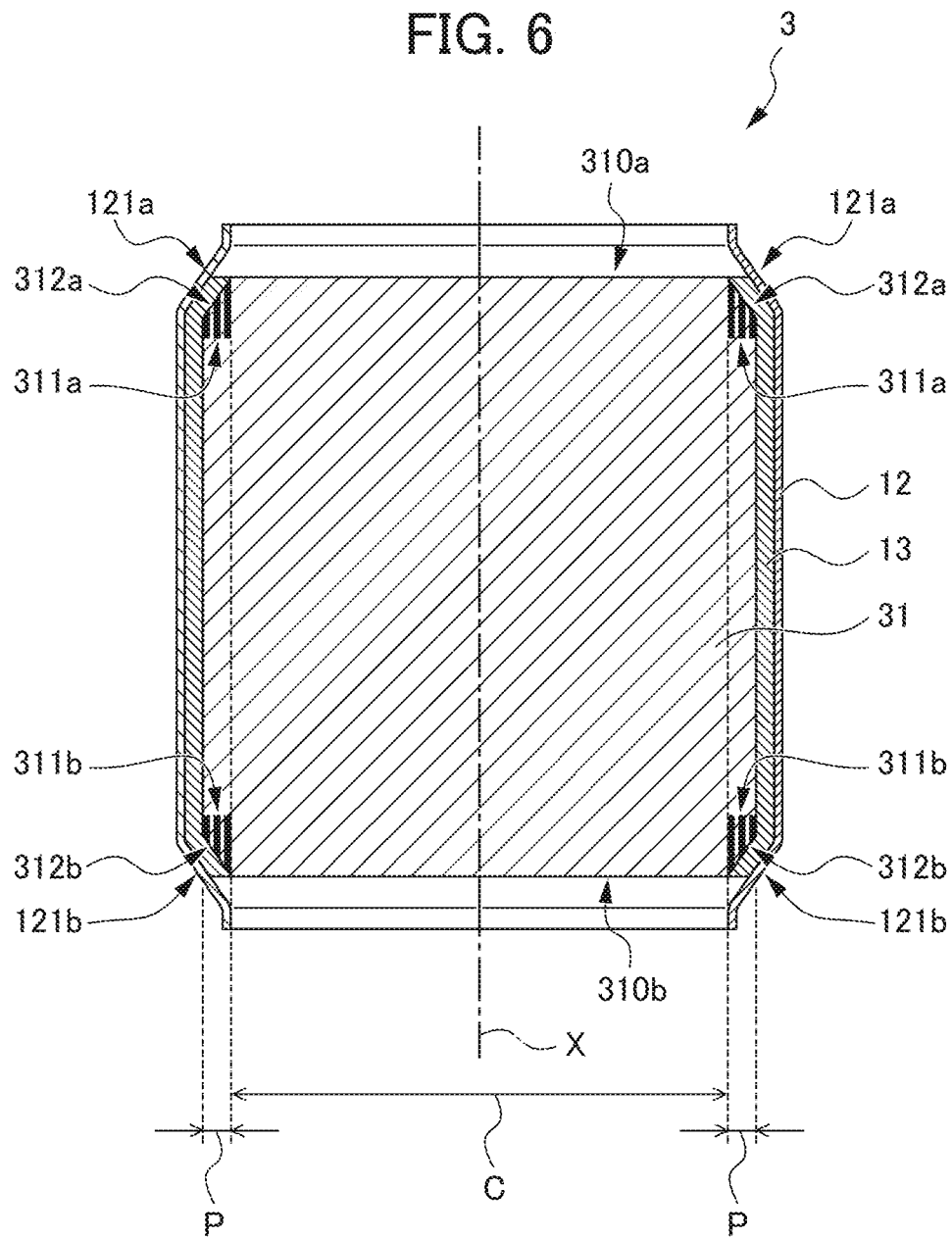
FIG. 6 is an axial-direction cross-sectional view of the exhaust gas purifying device according to a third embodiment of the present invention.

FIG. 6 is an axial-direction cross-sectional view of an exhaust gas purifying device 3 according to a third embodiment of the present invention. As shown in FIG. 6, the exhaust gas purifying device 3 according to the present embodiment is the same configuration compared to the exhaust gas purifying device 1 according to the first embodiment, except for the point of the radial-direction central part C of a honeycomb carrier 31 not being sealed differing. In other words, the honeycomb carrier 31 of the present embodiment is not a filter, but rather a flow-through type catalytic converter. According to the present embodiment, similar effects as the effects of the first embodiment are exerted. It should be noted that, in the present embodiment, the exhaust gas purifying catalyst that is loaded is not limited to a three-way catalyst, and it is possible to use various exhaust gas purifying catalysts such as oxidation catalysts and NOx catalysts.

Fourth Embodiment

An exhaust gas purifying device according to a fourth embodiment of the present invention is the same configuration compared to the exhaust gas purifying device 1 according to the first embodiment, except for the configuration of a honeycomb carrier 41 differing. Hereinafter, the configuration of the honeycomb carrier 41 will be explained while referencing FIG. 7. Herein, FIG. 7 provides drawings showing a method of manufacturing an exhaust gas purifying device according to the present embodiment.

Figure 7:
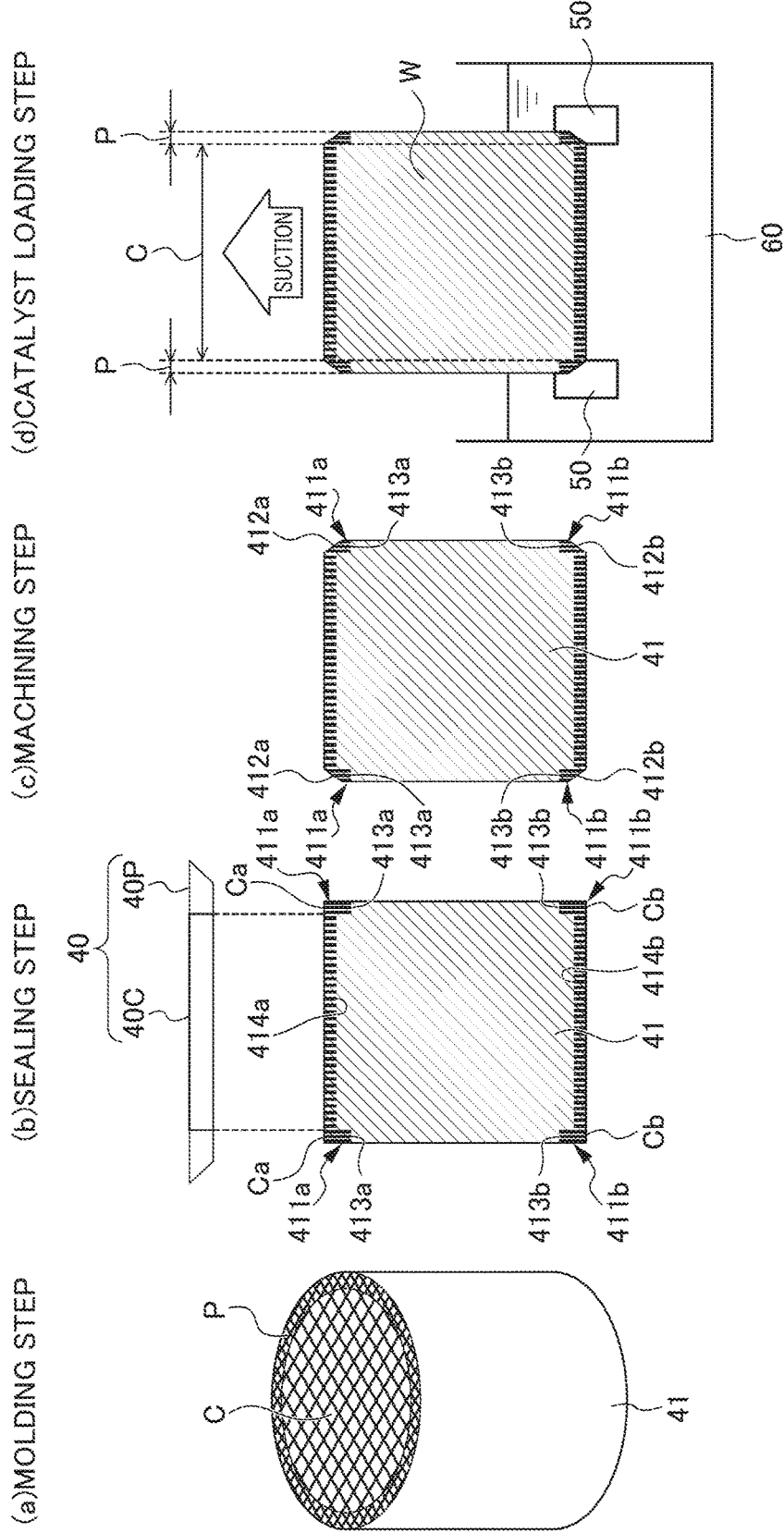
FIG. 7 is a perspective view of an exhaust gas purifying device of an internal-combustion engine according to a fourth embodiment of the present invention.

As shown in FIG. 7, the method of manufacturing an exhaust gas purifying device according to the present embodiment includes (a) a molding step, (b) sealing step, (c) machining step, (d) catalyst loading step, and a housing step that is not illustrated. The method of manufacturing an exhaust gas purifying device according to the present embodiment differs compared to the first embodiment in (a) the molding step and (b) sealing step.

In (a) the molding step of the present embodiment, the honeycomb carrier 41 with an opening area of cells in the outer circumferential part smaller than the opening area of cells in the central part is famed, which is different from the honeycomb carrier 11 of the first embodiment in which the opening area of cells are uniform. More specifically, by adjusting the slit width on the molding side of the honeycomb carrier molding cap (not illustrated) used in the present molding step so that the outer circumferential part is larger than the central part, the honeycomb carrier 41 of the present embodiment is obtained.

In this way, the honeycomb carrier 41 of the present embodiment differs from the honeycomb carrier 11 of the first embodiment in the point of the opening area of cells constituting the radial-direction outer circumferential part P being smaller than the opening area of cells constituting the radial-direction central part C. By the capillary phenomenon occurring upon pouring the sealing agent into the cells in (b) the sealing step described later, the sealing agent is thereby drawn into the radial-direction outer circumferential part P with a stronger force than the radial-direction central part C. As a result thereof, the sealing depth can be made deeper at the radial-direction outer circumferential part P than the radial-direction central part C in a one-time sealing step, whereby the position in the center axis X direction is arranged more to the inner side in the center axis X direction for end faces 413a, 413b in the center axis X direction inner side of sealing of the outer circumferential sealed parts 411a, 411b than end faces 414a, 414b at the center axis X direction inner side of sealing of the radial-direction central part C.

With (b) the sealing step of the present embodiment, the configuration of the masking used in sealing differs compared to the first embodiment. More specifically, it differs in the point of a masking 40 used in the present embodiment having a plurality of openings corresponding to the sizes of cells in the honeycomb carrier 41, and the opening area of an outer circumferential part 40P being set to be smaller than the opening area of a central part 40C. Sealing of the honeycomb carrier 41 thereby becomes possible.

According to the present embodiment, the following effects are exerted in addition to the effects of the first embodiment. In other words, with the present embodiment, a GPF having a wall-flow part W at the radial-direction central part C that is orthogonal to the center axis X direction thereof is used as the honeycomb carrier 41, and the opening area of cells in the outer circumferential sealed parts 411a, 411b is formed to be smaller than the opening area of cells in the radial-direction central part C. In addition, the end faces 413a, 413b at the center axis X direction inner side of sealing of the outer circumferential sealed parts 411a, 411b are thereby arranged so as to have a position in the center axis X direction located more to the inner side in the center axis X direction than the end faces 414a, 414b at the center axis X direction inner side of sealing of the radial-direction central part C. In other words, the sealing depth of the outer circumferential sealed parts 411a, 411b is made deeper than the sealing depth of the radial-direction central part C. According to the present embodiment, since the opening area of cells in the outer circumferential sealed parts 411a, 411b is smaller than the opening area of cells in the radial-direction central part C, it is possible to produce a structure in which the sealing depth of the outer circumferential sealed parts 411a, 411b is deeper than the radial-direction central part C in a one-time sealing step, by way of the capillary phenomenon upon pouring sealing agent into the cells in the sealing step. In other words, it is possible to sufficiently ensure the sealing depth of the outer circumferential sealed parts 411a, 411b in which the sloped parts 412a, 412b are famed by grinding or cutting, without requiring a complicated process, and thus the manufacturing cost can be reduced. In addition, since the thickness of the separating wall between adjacent cells can be made thicker from the outer circumferential sealed parts 411a, 411b having a smaller opening area of cells, it is possible to improve the mechanical strength of the radial-direction outer circumferential part P, and thus damage to the outer edge part, etc. of the honeycomb carrier 41 can be suppressed.

In addition, with the present embodiment, the honeycomb carrier 41 in which the opening area of cells in the radial-direction outer circumferential part P at both end faces in the center axis X direction is smaller than the opening area of cells in the radial-direction central part C thereof is used in (b) the sealing step of the method of manufacturing an exhaust gas purifying device, and it is sealed so that the end faces 413a, 413b at the center axis X direction inner side of sealing of the outer circumferential sealed parts 411a, 411b are arranged more to the inner side in the center axis direction than the end faces 414a, 414b at the center axis X direction inner side of sealing of the radial-direction central part C. Similar effects as the aforementioned effects are thereby exerted.

Fifth Embodiment

The exhaust gas purifying device according to a fifth embodiment of the present invention is the same configuration compared to the exhaust gas purifying device 1 according to the first embodiment, except for the configuration of a honeycomb carrier 51 differing. Hereinafter, the configuration of the honeycomb carrier 51 will be explained while referencing FIG. 8. Herein, FIG. 8 is an axial-direction cross-sectional view of the honeycomb carrier 51 according to the present embodiment.

Figure 8:
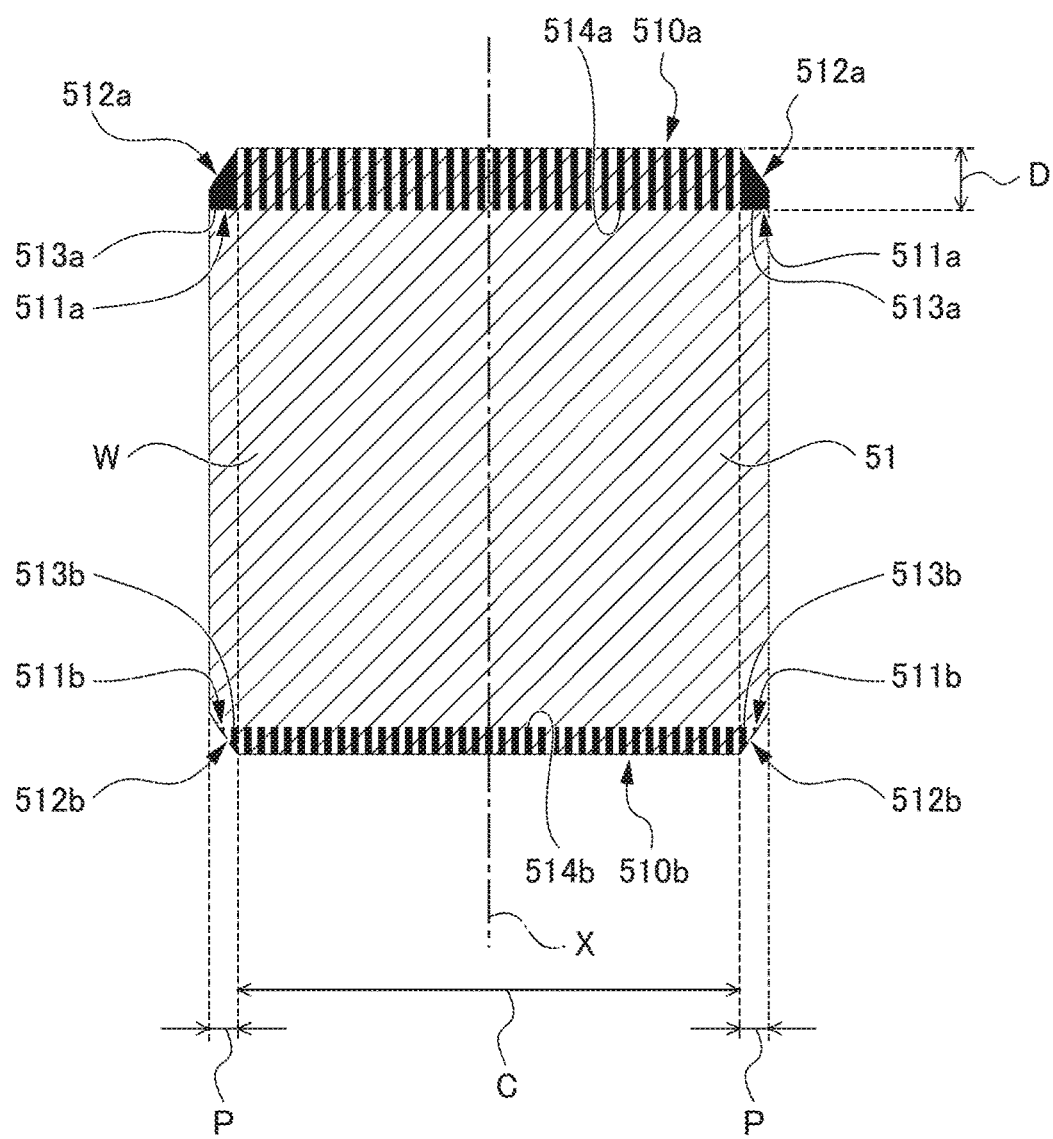
FIG. 8 is an axial-direction cross-sectional view of a honeycomb carrier of an exhaust gas purifying device according to a fifth embodiment of the present invention.

As shown in FIG. 8, the honeycomb carrier 51 according to the present embodiment differs compared to the honeycomb carrier 11 of the first embodiment in the point of the position in the center axis X direction of the end face 513A on the center axis X direction inner side of sealing of the outer circumferential sealed part 511a and the position in the center axis X direction of the end face 514a on the center axis X direction inner side of sealing of the radial-direction central part C being substantially identical at one end face 510a. In addition, the outer circumferential sealed part 511a differs from the outer circumferential sealed part 111a of the honeycomb carrier 11 of the first embodiment, and the openings of all cells are sealed.

Similarly, the honeycomb carrier 51 according to the present embodiment differs compared to the honeycomb carrier 11 of the first embodiment in the point of the position in the center axis X direction of the end face 513b on the center axis X direction inner side of sealing of the outer circumferential sealed part 511b and the position in the center axis X direction of the end face 514b on the center axis X direction inner side of sealing of the radial-direction central part C being substantially the same also at the other end face 510b in the center axis X direction.

Furthermore, the honeycomb carrier 51 according to the present embodiment differs compared to the honeycomb carrier 11 of the first embodiment in the point of the sealing depth of the radial-direction central part C at the other end face 510b being shorter than the sealing depth of the radial-direction central part C at the one end face 510a. It should be noted that, contrary to the honeycomb carrier 11 of the first embodiment, in the honeycomb carrier 51 according to the present embodiment, the radial-direction outer side of the sloped part 512b at the other end face 510b is not sealed. In other words, the outer circumferential sealed part 511b is only provided to a part on the radial-direction inner side of the sloped part 512b.

Figure 9:
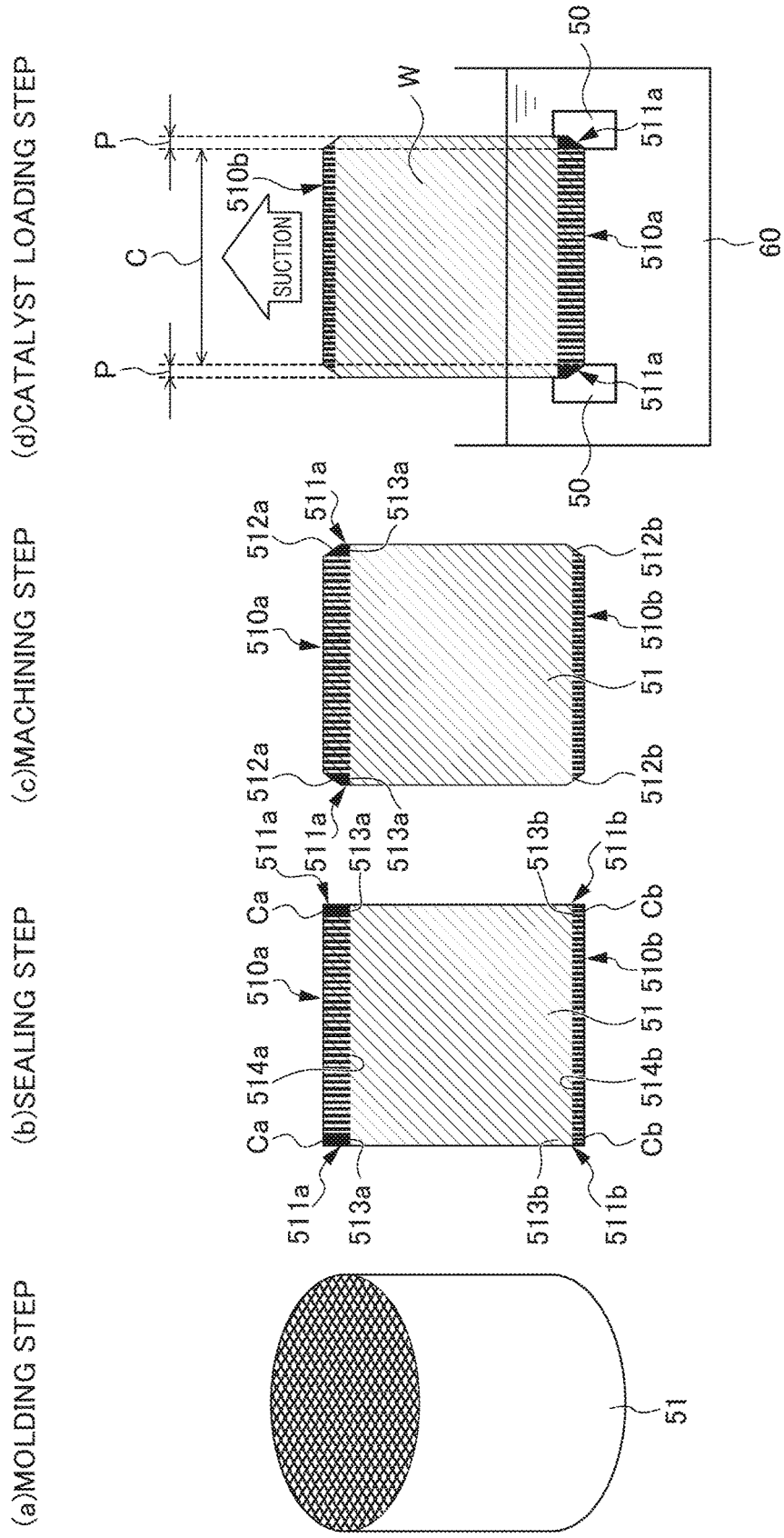
FIG. 9 is a view showing a method of manufacturing the exhaust gas purifying device according to the fifth embodiment of the present invention.

The configuration of the honeycomb carrier 51 will be explained in further detail by referencing FIG. 9. Herein, FIG. 9 is a view showing the method of manufacturing an exhaust gas purifying device according to the present embodiment. As shown in FIG. 9, the method of manufacturing an exhaust gas purifying device according to the present embodiment includes (a) a molding step, (b) sealing step, (c) machining step, (d) catalyst loading step, and a housing step that is not illustrated. In the method of manufacturing an exhaust gas purifying device according to the present embodiment, (b) the sealing step, (c) machining step and (d) catalyst loading step differ compared to the first embodiment.

In (b) the sealing step of the present embodiment, contrary to the first embodiment, at both the one end face 510a and the other end face 510b, the sealing depth in the radial-direction central part C thereof and the sealing depth in the radial-direction outer circumferential part P (outer circumferential sealed part 511a) are made substantially the same. In addition, at this time, the amount of sealing agent poured into the cells is adjusted so that the sealing depth at the other end face 510b becomes shorter than the sealing depth at the one end face 510a.

In addition, in (b) the sealing step of the present embodiment, contrary to the first embodiment, a masking (not illustrated) in which the radial-direction outer circumferential part is entirely opened corresponding to the cells of the honeycomb carrier 51 is used upon masking the one end face 510a. The outer circumferential sealed part 511a at one end face 510a is thereby completely sealed.

In (c) the machining step of the present embodiment, similarly to the first embodiment, the sloped parts 512a, 512b are famed by grinding/cutting the radial-direction outer circumferential part of both end faces. However, at this time, since the sealing depth of the other end face 510b is short in the present embodiment, the grinding/machining length in the center axis X direction is longer than the sealing depth of the other end face 510b. For this reason, in the present embodiment, a honeycomb carrier 51 is obtained in which the cells in a part on the radial-direction outer side of the sloped part 512b at the other end face 510b are not sealed and are opened.

In (d) the catalyst loading step of the present embodiment, the one end face 510a side which has a longer sealing depth than the other end face 510b is immersed in the slurry 60, and suction is conducted from the radial-direction central part C of the other end face 510b. At this time, since the outer circumferential sealed part 511a at the one end face 510a is completely sealed, the three-way catalyst is more reliably avoided from penetrating to the radial-direction outer circumferential part P, and the three-way catalyst is loaded only on the wall-flow part W.

According to the present embodiment, the following effects are exerted in addition to the effects of the first embodiment. In the present embodiment, a GPF having a wall-flow part W at the radial-direction central part C that is orthogonal to the center axis X direction thereof is used as the honeycomb carrier 51, and the end face 513a on the center axis X direction inner side of sealing of the outer circumferential sealed part 511a and the end face 514a on the center axis X direction inner side of sealing of the radial-direction central part C at the one end face 510a are famed so that the positions in the center axis X direction become substantially the same. Furthermore, the sealing depth of the radial-direction central part C at the other end face 510b in the center axis X direction is made shorter than the sealing depth of the radial-direction central part C at the one end face 510a. Herein, in the case of forming the sloped parts by grinding or cutting a part of the outer circumferential sealed part, it is necessary to ensure a sealing depth of the outer circumferential sealed part of a certain size, and thus requires a complex step in order to lengthen the sealing depth of only the outer circumferential sealed part. On the other hand, if also lengthening the sealing depth of the radial-direction central part in accordance with the sealing depth of the outer circumferential sealing by way of simplifying the sealing step to one-time sealing, the required filter volume can no longer be ensured and leads to pressure loss. In contrast, according to the present embodiment, even in a case of the positions of each end face 513a, 514a on the center axis direction inner side of both parts being substantially equal by simultaneously sealing the outer circumferential sealed part 511a and the radial-direction central part C by sealing one time (i.e. case of the sealing depths of both parts being equal), it is possible to maintain sealing by forming the sloped part 512a in the radial-direction outer circumferential part P at the one end face 510a of long sealing depth, and the outer circumferential sealed part 511a can be famed. Therefore, it is possible to cut the workload of the sealing step, and thus the manufacturing cost can be reduced. In addition, by shortening the sealing depth of the other end face 510b, it is possible to ensure the filter volume, and worsening of the pressure loss can be avoided. Furthermore, by arranging the one end face 510a side of the honeycomb carrier 51 of the present embodiment at the exhaust gas outlet side (downstream side), and arranging the other end face 510b side thereof at the exhaust gas inlet side (upstream side), since the outer circumferential sealed part 511a of the one end face 510a which is completely sealed will be arranged at the downstream side, it is possible to more reliably avoid particulate matter (PM) and ash from discharging to the downstream side.

In addition, according to the present embodiment, in the sealing step of the method of manufacturing an exhaust gas purifying device, the sealing depth of the radial-direction central part C at the one end face 510a of the honeycomb carrier 51 is made substantially the same as the sealing depth of the outer circumferential sealed part 511a, and the sealing depth of the radial-direction central part C at the other end face 510b is made shorter than the sealing depth of the radial-direction central part C at the one end face 510a. Similar effects as the aforementioned effects are thereby exerted.

Sixth Embodiment

Figure 10:
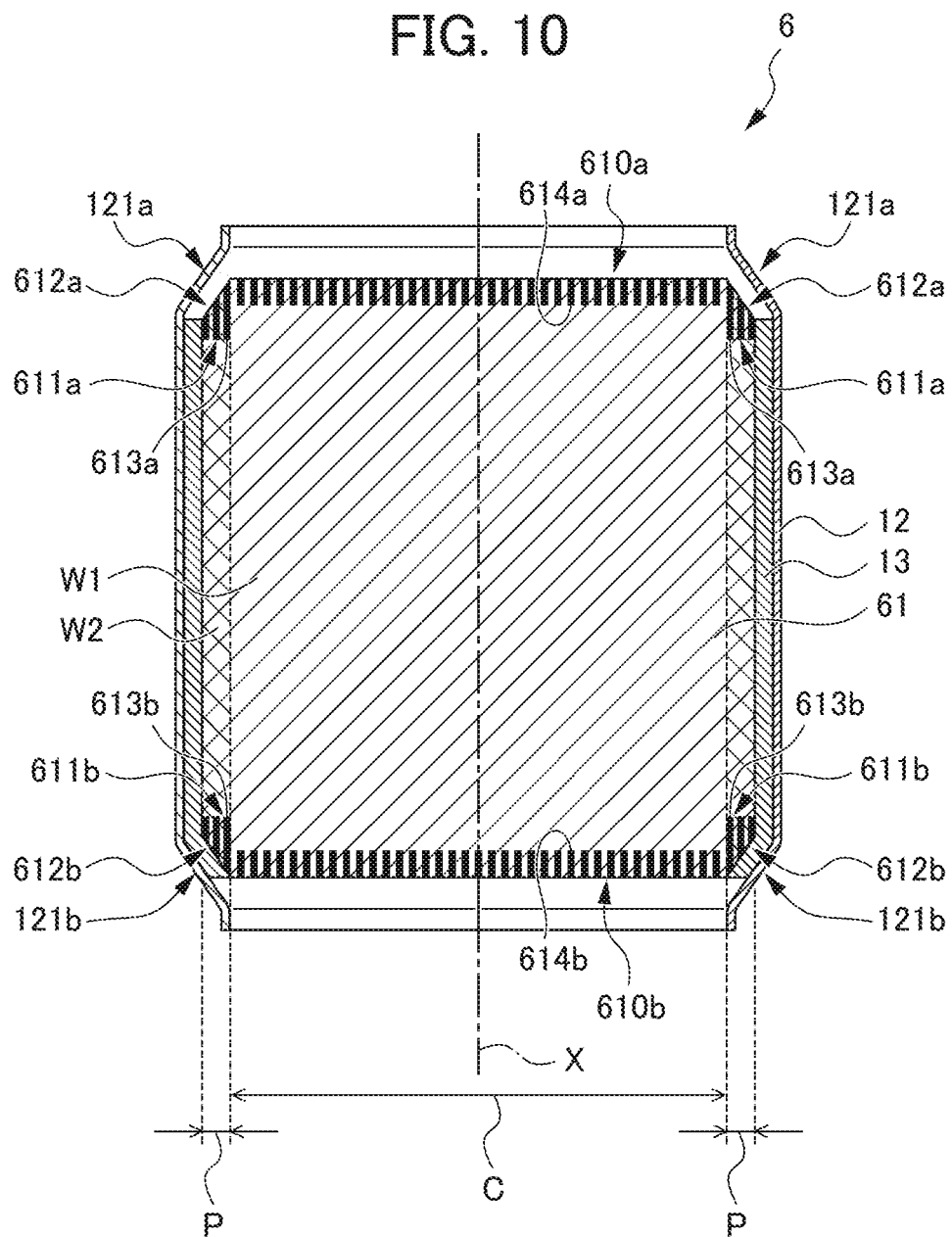
FIG. 10 is an axial-direction cross-sectional view of an exhaust gas purifying device according to a sixth embodiment of the present invention.

FIG. 10 is an axial-direction cross-sectional view of an exhaust gas purifying device 6 according to a sixth embodiment of the present invention. As shown in FIG. 10, the exhaust gas purifying device 6 according to the present embodiment is the same configuration compared to the exhaust gas purifying device 1 according to the first embodiment, except for the configurations of the retaining member 13 and wall-flow parts W1, W2 differing.

More specifically, the exhaust gas purifying device of the present embodiment as shown in FIG. 10 differs compared to the exhaust gas purifying device of the first embodiment in the point of the retaining member 13 not being interposed between the case member 12 and a sloped part 612a at one end face 610a of the honeycomb carrier 61. In other words, the exhaust gas purifying device 6 of the present embodiment is a configuration in which exhaust gas tends to influx at the radial-direction outer circumferential part P at which the retaining member 13 is not interposed, by way of arranging the one end face 610a of the honeycomb carrier 61 at the exhaust gas inlet side (upstream side).

In addition, the honeycomb carrier 61 according to the present embodiment has not only the wall-flow part W1 at the radial-direction central part C, but also the wall-flow part W2 at the radial-direction outer circumferential part P like the honeycomb carrier 11 of the first embodiment; however, it differs in the point of the three-way catalyst being loaded onto both the wall-flow parts W1 and W2. However, the amount of three-way catalyst loaded on the wall-flow part W2 is smaller than the three-way catalyst loaded on the wall-flow part W1.

The method of manufacturing the exhaust gas purifying device 6 according to the present embodiment differs compared to the method of manufacturing the exhaust gas purifying device 1 according to the first embodiment only in (d) the catalyst loading step.

In (d) the catalyst loading step of the present embodiment, the three-way catalyst is loaded so that the three-way catalyst amount loaded on the wall-flow part W2 at the radial-direction outer circumferential part P is smaller than the wall-flow part W1 at the radial-direction central part C. As a specific procedure, first, the outer circumferential part (radial-direction outer circumferential part P) of one end face in the center axis X direction of the honeycomb carrier 61 is immersed in a slurry containing the three-way catalyst in a state sealed by a clamp sealing member. Next, it is suctioned from the radial-direction central part C of either one end face. Furthermore, the clamp sealing member is removed, and suctioned again in a similar manner. Alternatively, the suction force at the radial-direction outer circumferential part P is set to be less than at the radial-direction central part C, and suctioning is executed. The honeycomb carrier 61 is thereby obtained in which the three-way catalyst amount loaded on the radial-direction outer circumferential part P is less than the three-way catalyst amount loaded on the radial-direction central part C.

According to the present embodiment, the following effects are exerted in addition to the effects of the first embodiment. In other words, in the exhaust gas purifying device 6 according to the present embodiment, the retaining member 13 is interposed between the case member 12 and the sloped part 612b of the other end face 610b, but is not interposed between the case member 12 and the sloped part 612a at the one end face 610a of the honeycomb carrier 61. In addition, since the sloped part 612b on the downstream side is interposed by the retaining member 13, the honeycomb carrier 61 is retained within the case member 12 by catching against the inner walls of the case sloped part 121b of the case member 12 via the protecting member 13. By arranging the one end face 610a of this honeycomb carrier 61 at the exhaust gas inlet side (upstream side), the exhaust gas tends to influx at the wall-flow part W2 of the radial-direction outer circumferential part P from the sloped part 612a at which the retaining member 13 is not interposed. Herein, if particulate matter (PM) and ash deposit within the honeycomb carrier, it leads to a decline in the exhaust gas purifying function due to an increase in pressure loss and plugging of the three-way catalyst, and causes the lifespan of the exhaust gas purifying device to decline. In particular, it is a problem since ash continuously deposits without combusting. In contrast, according to the present embodiment, particulate matter (PM) and ash is preferentially collected on the wall-flow part W2 at the radial-direction outer circumferential part P into which the exhaust gas tends to flow. In other words, it is possible to effectively apply the wall-flow part W2 as a collection part having a particulate matter (PM) and ash collecting function. After particulate matter (PM) and ash deposit on the wall-flow part W2 and pressure loss increases, the exhaust gas flows into the wall-flow part W1, the particulate matter (PM) and ash are collected by the wall-flow part W1, and the exhaust gas is purified by the three-way purifying catalyst; therefore, an exhaust gas purifying device of long lifespan is obtained. Furthermore, with the honeycomb carrier 61 of the present embodiment, the three-way catalyst amount loaded on the wall-flow part W2 is smaller than the three-way catalyst amount loaded on the wall-flow part W1. By decreasing the three-way catalyst amount loaded on the wall-flow part W2, since the pressure loss of the wall-flow part W2 becomes less, particulate matter (PM) and ash are more preferentially collected on the wall-flow part W2. Therefore, the function as a collection part of the wall-flow part W2 is more reliably exhibited. In addition, since the wall-flow part W2 mainly has a function as a collection part as mentioned earlier, the exhaust gas purifying function of the exhaust gas purifying device overall is almost unchanged even when setting the loading amount of three-way catalyst to be small. Therefore, by decreasing the three-way catalyst amount loaded on the wall-flow part W2, it is possible to avoid wasteful loading of exhaust gas purifying catalyst, and thus the manufacturing cost can be curbed.

Seventh Embodiment

Figure 11:
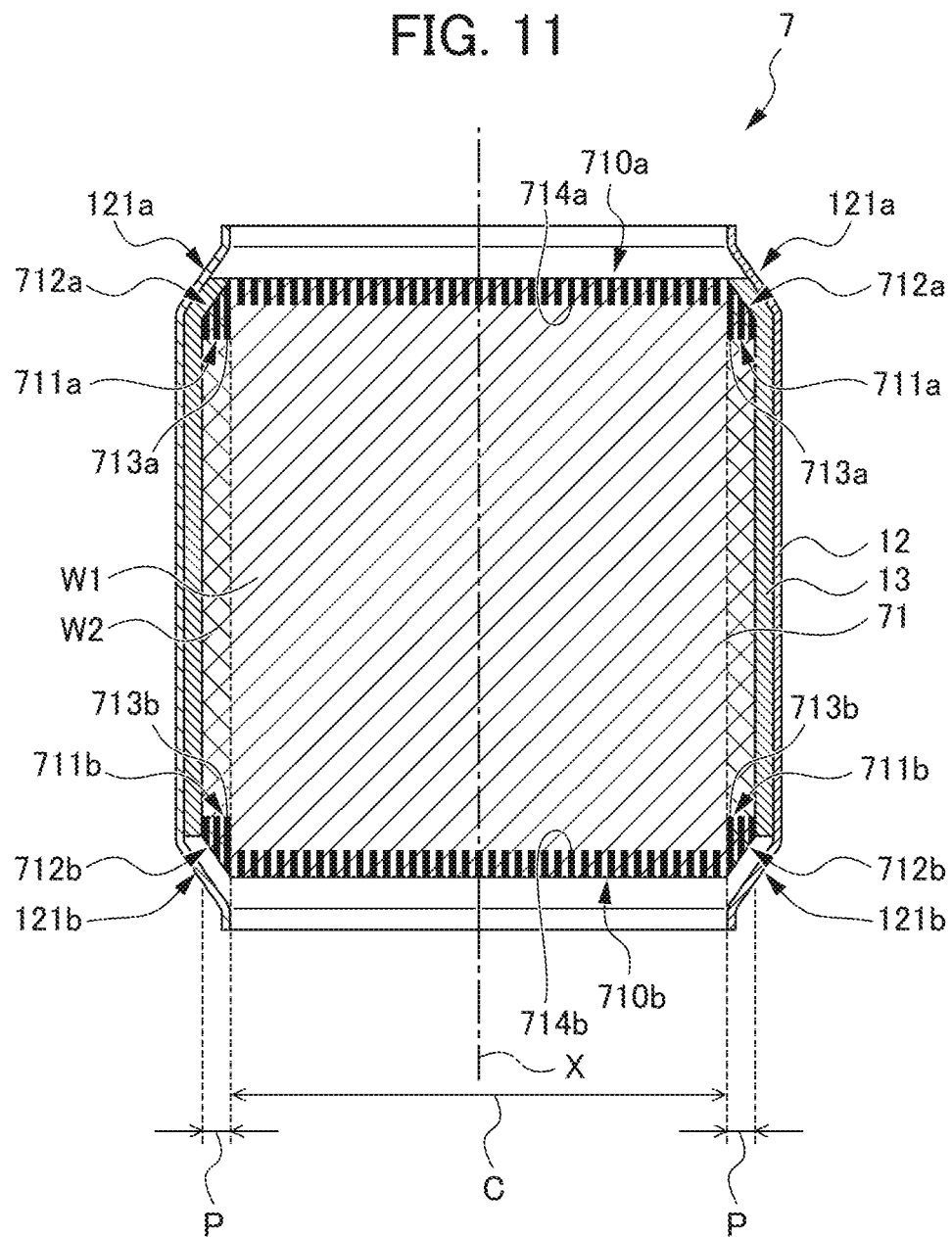
FIG. 11 is an axial-direction cross-sectional view of an exhaust gas purifying device according to a seventh embodiment of the present invention.

FIG. 11 is an axial-direction cross-sectional view of an exhaust gas purifying device 7 according to a seventh embodiment of the present invention. As shown in FIG. 11, the exhaust gas purifying device 7 according to the present embodiment is the same configuration compared to the exhaust gas purifying device 1 according to the first embodiment, except for the configurations of the retaining member 13 and wall-flow parts W1, W2 differing.

More specifically, the exhaust gas purifying device of the present embodiment as shown in FIG. 11 differs compared to the exhaust gas purifying device of the first embodiment in the point of the retaining member 13 not being interposed between the case member 12 and a sloped part 712b at the other end face 710b of the honeycomb carrier 71. In other words, the exhaust gas purifying device 7 of the present embodiment is a configuration in which exhaust gas tends to influx from the radial-direction outer circumferential part P at which the retaining member 13 is not interposed, by arranging the other end face 710b of the honeycomb carrier 71 at the exhaust gas outlet side.

In addition, the honeycomb carrier 71 according to the present embodiment has not only the wall-flow part W1 at the radial-direction central part C, but also the wall-flow part W2 at the radial-direction outer circumferential part P like the honeycomb carrier 11 of the first embodiment; however, it differs in the point of the three-way catalyst being loaded onto both the wall-flow parts W1 and W2. It should be noted that, contrary to the honeycomb carrier 61 of the sixth embodiment, the amount of three-way catalyst loaded on the wall-flow part W1 and the amount of three-way catalyst loaded on the wall-flow part W2 are equivalent.

The method of manufacturing the exhaust gas purifying device 7 according to the present embodiment differs compared to the method of manufacturing the exhaust gas purifying device 1 according to the first embodiment only in (d) the catalyst loading step. More specifically, in (d) the catalyst loading step of the present embodiment, the three-way catalyst is loaded so that the three-way catalyst amounts loaded on the wall-flow part W1 at the radial-direction central part C and the wall-flow part W2 at the radial-direction outer circumferential part P are equivalent.

According to the present embodiment, the following effects are exerted in addition to the effects of the first embodiment. In other words, in the exhaust gas purifying device 7 of the present embodiment, the retaining member 13 is interposed between the case member 12 and the sloped part 712a at one end face 710a of the honeycomb carrier 71, and is not interposed between the case member 12 and the sloped part 712b at the other end face 710b. Furthermore, by arranging the one end face 710a of the honeycomb carrier 71 at the exhaust gas inlet side (upstream side), particulate matter (PM) and ash will not influx to the wall-flow part W2 at the radial-direction outer circumferential part P from the sloped part 712a at which the retaining member 13 is interposed. In addition, with the sloped part 712b on the downstream side, since the retaining member 13 is not interposed, exhaust gas tends to discharge to the downstream side from the wall-flow part W2. Herein, when particulate matter (PM) and ash deposit within the honeycomb carrier, it leads to a decline in the exhaust gas purifying function due to an increase in pressure loss and plugging of the three-way catalyst, and thus causes the lifespan of the exhaust gas purifying device to decline. In particular, it is a problem since ash continuously deposits without combusting. In contrast, according to the present embodiment, three-way catalyst of equivalent amount to the wall-flow part W1 is loaded on the wall-flow part W2, and particulate matter (PM) and ash do not influx. Therefore, after particulate matter (PM) and ash deposit on the wall-flow part W1 and the pressure loss increases, the exhaust gas influxes to the wall-flow part W2, and the exhaust tends to be purified by the three-way catalyst loaded on the wall-flow part W2, and discharge to the downstream side. Consequently, the decline in exhaust gas purifying function due to an increase in pressure loss and plugging of the three-way catalyst as the exhaust gas purifying device overall is suppressed, and an exhaust gas purifying device of long lifespan is obtained.

Eighth Embodiment

Figure 12:
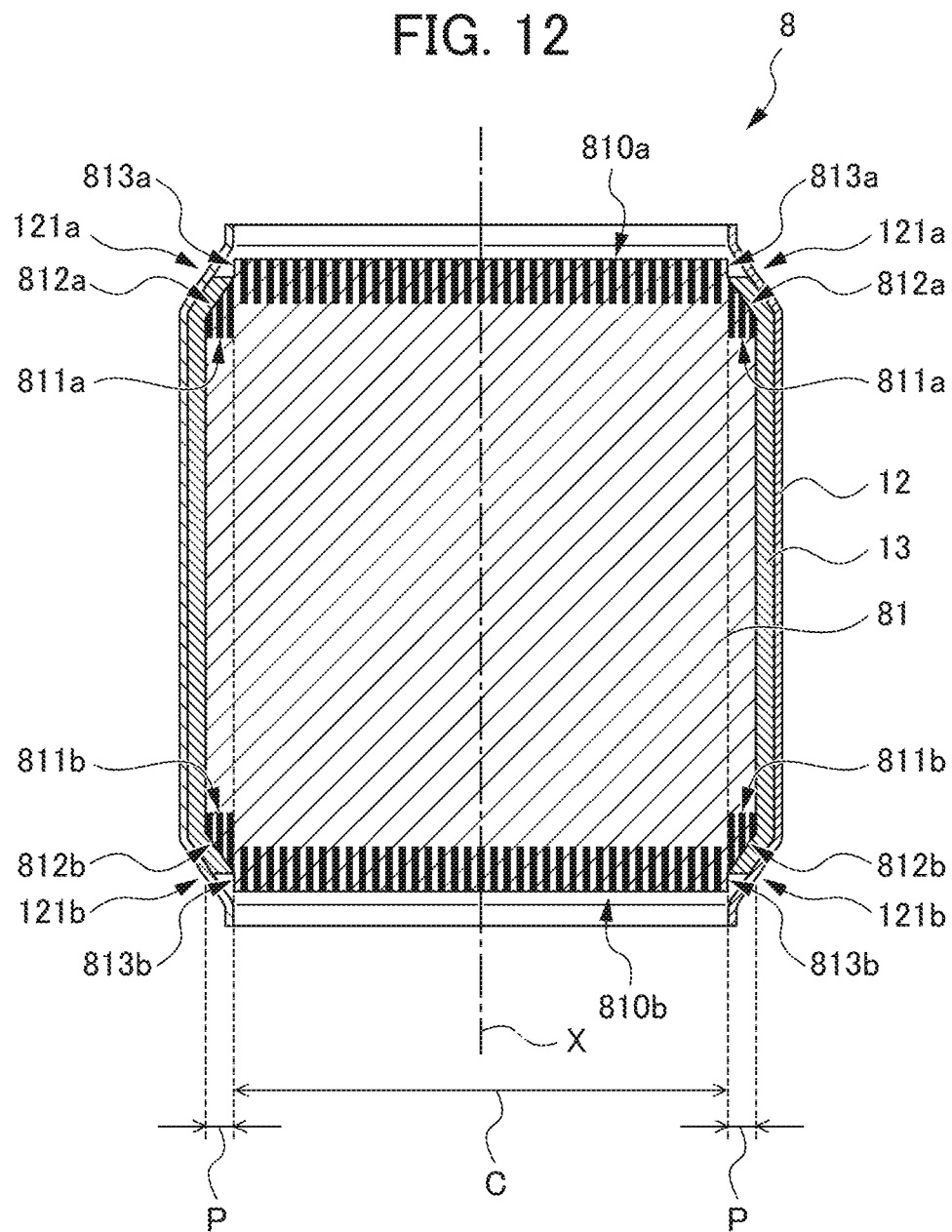
FIG. 12 is an axial-direction cross-sectional view of an exhaust gas purifying device according to an eighth embodiment of the present invention.

FIG. 12 is an axial-direction cross-sectional view of an exhaust gas purifying device 8 according to the present embodiment. The exhaust gas purifying device 8 according to the eighth embodiment of the present invention is the same configuration compared to the exhaust gas purifying device 1 according to the first embodiment, except for the configuration of the honeycomb carrier 81 differing.

As shown in FIG. 12, the honeycomb carrier 81 according to the present embodiment has sloped parts 812a, 812b, and vertical parts 813a, 813b that link end faces 810a, 810b in the center axis X direction and the outer circumferential edge, and are perpendicular relative to both end faces.

According to the present embodiment, similar effects as the effects of the first embodiment are exerted. In addition, by the honeycomb carrier 81 having the vertical parts 813a, 813b, positioning of the retaining member 13 is facilitated. In particular, jutting out of the retaining member 13 to the radial-direction central part C upon housing the honeycomb carrier 81 in the case member 12, and the interposing of the radial-direction outer circumferential part P by the retaining member 13 becoming insufficient can be reliably prevented. Therefore, a more reliable exhaust gas purifying function is obtained.

Ninth Embodiment

Figure 13:
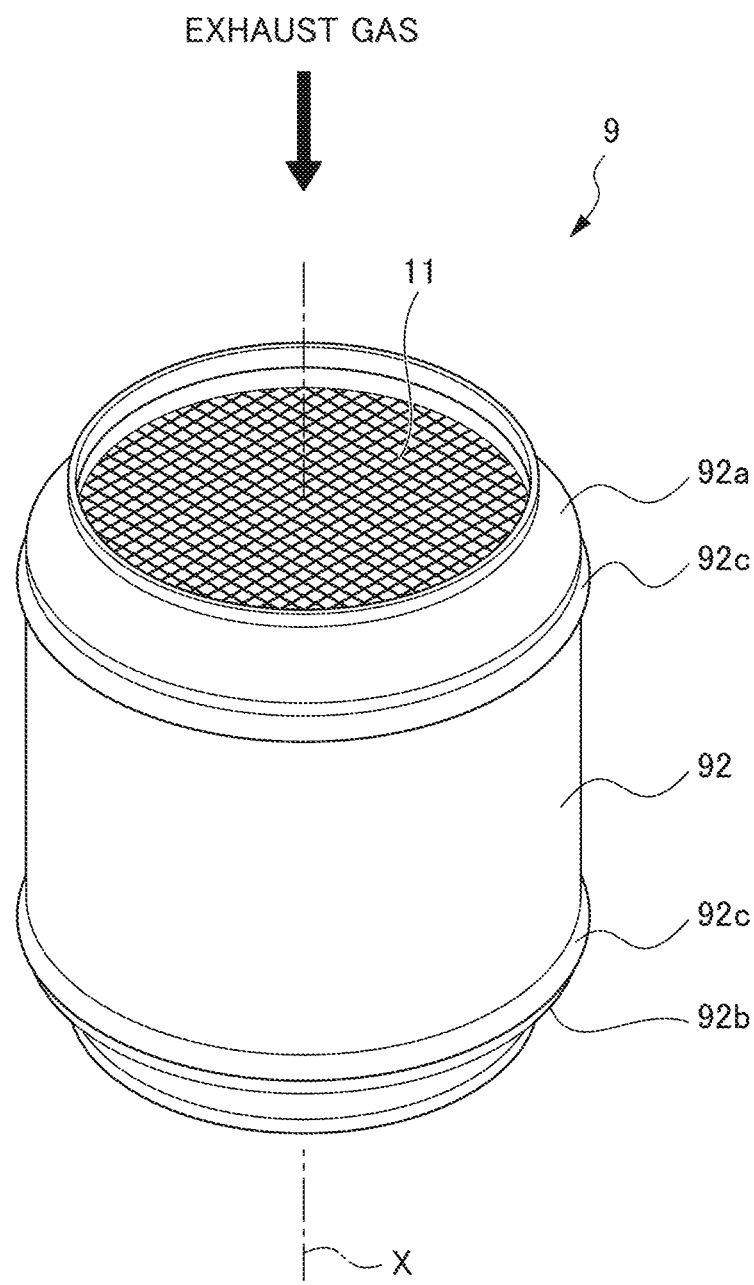
FIG. 13 is a perspective view of an exhaust gas purifying device of an internal-combustion engine according to a ninth embodiment of the present invention.
Figure 14:
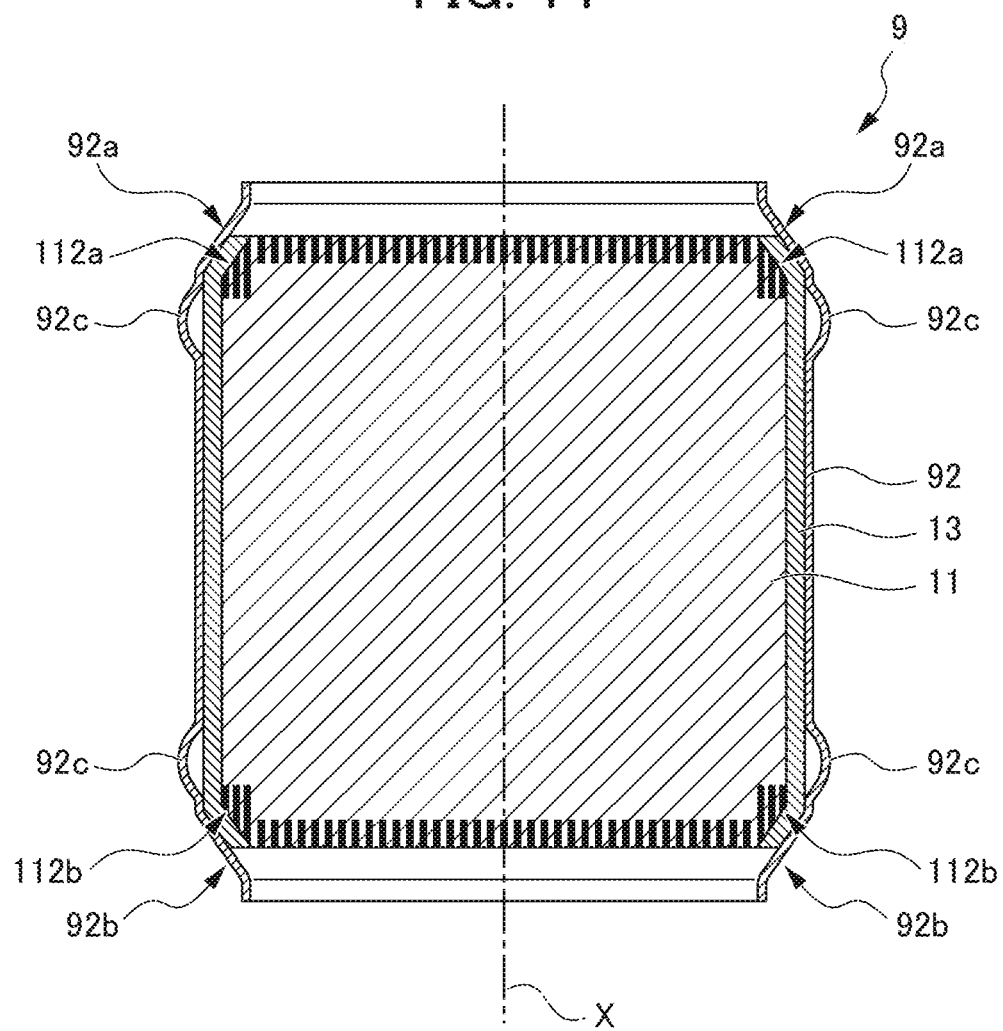
FIG. 14 is an axial-direction cross-sectional view of the exhaust gas purifying device according to the ninth embodiment of the present invention.

The exhaust gas purifying device 9 according to a ninth embodiment of the present invention is the same configuration as the first embodiment, except for the configuration of a case member 92 differing compared to the exhaust gas purifying device 1 according to the first embodiment. Hereinafter, the configuration of the case member 92 will be explained by referencing FIGS. 13 and 14. Herein, FIG. 13 is a perspective view of the exhaust gas purifying device 9 of an internal-combustion engine according to the ninth embodiment of the present invention. FIG. 14 is an axial-direction cross-sectional view of the exhaust gas purifying device 9 according to the ninth embodiment of the present invention.

As shown in FIGS. 13 and 14, the case member 92 of the present embodiment differs from the case member 12 of the first embodiment of clamshell type, and is a case member of so-called shrink type formed by reducing the diameters of both ends in the center axis X direction of a cylindrical case member (exhaust gas inlet side end and outlet side end). This case member 92 includes case sloped parts 92a, 92b famed along the sloped parts 112a, 112b of the honeycomb carrier 11, similarly to the case member 12 of the first embodiment. In other words, the case sloped parts 92a, 92b in which sloped planes sloping in a direction that gradually decreases in diameter as approaching towards the opening side of the case member 92 (exhaust gas inlet side or outlet side) are provided to both ends in the center axis X direction of the case member 92.

In addition, as shown in FIGS. 13 and 14, the case member 92 includes convex parts 92c, 92c famed in the vicinity of the case sloped parts 92*a*, 92*b* and the interior thereof projecting to the outer side. These convex parts 92*c*, 92*c* are respectively famed along the entire circumference to extend from the case sloped parts 92*a*, 92*b* in the circumferential direction, in the vicinity of an opposite side (center axis X direction inner side of the honeycomb carrier 11) to the opening side of the case member 92. In addition, these convex parts 92*c*, 92*c* are formed to project from the exterior of the case member 92 to the outer side, so that the interior thereof becomes convex to the outer side.

The thickness of the convex parts 92*c*, 92*c* is preferably at least 3 mm. So long as the thickness of the convex parts 92*c*, 92*c* is within this range, it will be possible to let material flowing upon molding the case sloped parts 92*a*, 92*b* into the convex parts 92*c*, 92*c* as described later. In addition, the height of the convex parts 92*c*, 92*c* is preferably at least 3 mm and no more than 20 mm. So long as the height of 92*c*, 92*c* is within this range, it is possible to let the material flowing upon molding the case sloped parts 92*a*, 92*b* into the convex parts 92*c*, 92*c* as described later.

The case member 92 having the case sloped parts 92*a*, 92*b* is produced in the following way, for example. First, the honeycomb carrier 11 around which the retaining member 13 is wrapped on the entire circumference over the entirety of the outer circumferential-side face is inserted into the cylindrical case member prior to forming the case sloped parts 92*a*, 92*b*. Next, by reducing the diameter of both ends in the center axis X direction of the case member 92 by pressing from the exterior side by press molding, the case sloped parts 92*a*, 92*b* are formed. The case member 92 having the case sloped parts 92*a*, 92*b* is thereby produced.

Herein, in press molding performed upon forming the case sloped parts, since the case member is a cylindrical shape, it is not possible to push the press die only from the exterior side against the case member, i.e. only from one side. For this reason, conventionally, the case member cannot sufficiently follow the die surface of the press die, and in particular, shaping of an R part or the like is difficult, and thus high molding precision of the case member parts is not obtained. In addition, since the case sloped parts do not become shapes that adequately follow the shape of the sloped parts of the honeycomb carrier, there is concern over the retaining of the honeycomb member being insufficient. In addition, by the flow of material being biased at the periphery of the case sloped parts (material aggregating), there is concern over wrinkles generating in the case sloped parts. Furthermore, wrinkles generate also in the retaining member at the periphery of these sloped parts, and the surface pressure of the retaining member on the honeycomb carrier becomes excessive, a result of which there is concern over the honeycomb carrier being damaged. In a case member of so-called 2BED type, these wrinkles remarkably generate also at an intermediate portion between the exhaust gas purifying device (1BED) on the upstream side and the exhaust gas purifying device (2BED) on the downstream side.

On the other hand, in the case of the case member 12 of clamshell type as in the first embodiment, press molding is possible prior to butt welding the two separated case halves 121, 122 to form one body. For this reason, press molding is possible by pressing the press die from both sides of the exterior side and interior side of the case member 12; therefore, high molding (dimensional) precision of the case sloped parts 121*a*, 121*b* tends to be obtained. However, in this case, positional adjustment of the honeycomb carrier 11 and retaining member 13 is difficult. In addition, biting of the retaining member 13 tends to occur upon butt welding the case halves 121, 122, and there is concern over the surface pressure on the honeycomb carrier 11 becoming excessive due to biting of the retaining member 13, and the honeycomb carrier 11 being damaged.

In contrast, with the present embodiment, by forming the convex parts 92*c*, 92*c* in the vicinity of the case sloped parts 92*a*, 92*b*, the material that flows during press molding is intentionally guided to the convex parts. By forming the convex parts 92*c*, 92*c* in the vicinity of the case sloped parts 92*a*, 92*b* which do not influence the retaining function of the honeycomb carrier 11, it is possible to avoid wrinkles, etc. from generating in the case sloped parts 92*a*, 92*b*, and thus high molding (dimensional) precision of the case sloped parts 92*a*, 92*b* is obtained, a result of which it is made possible to resolve the above-mentioned defects.

Next, a first method of manufacturing the exhaust gas purifying device 9 according to the present embodiment will be explained. The first method of manufacturing the exhaust gas purifying device 9 according to the present embodiment is the same compared to the method of manufacturing in the first embodiment, except for the housing step differing.

In the housing step of the present embodiment, first, the honeycomb carrier 11 around which the retaining member 13 is wrapped on the entire circumference over the entirety of the outer circumferential side is inserted into the cylindrical case member prior to forming the case sloped parts 92*a*, 92*b*. Next, by reducing the diameter of both ends in the center axis X direction of the case member 92 by pressing from the exterior side thereof by press molding, the case sloped parts 92*a*, 92*b* are famed. The case member 92 having the case sloped parts 92*a*, 92*b* is thereby produced.

Figure 15:
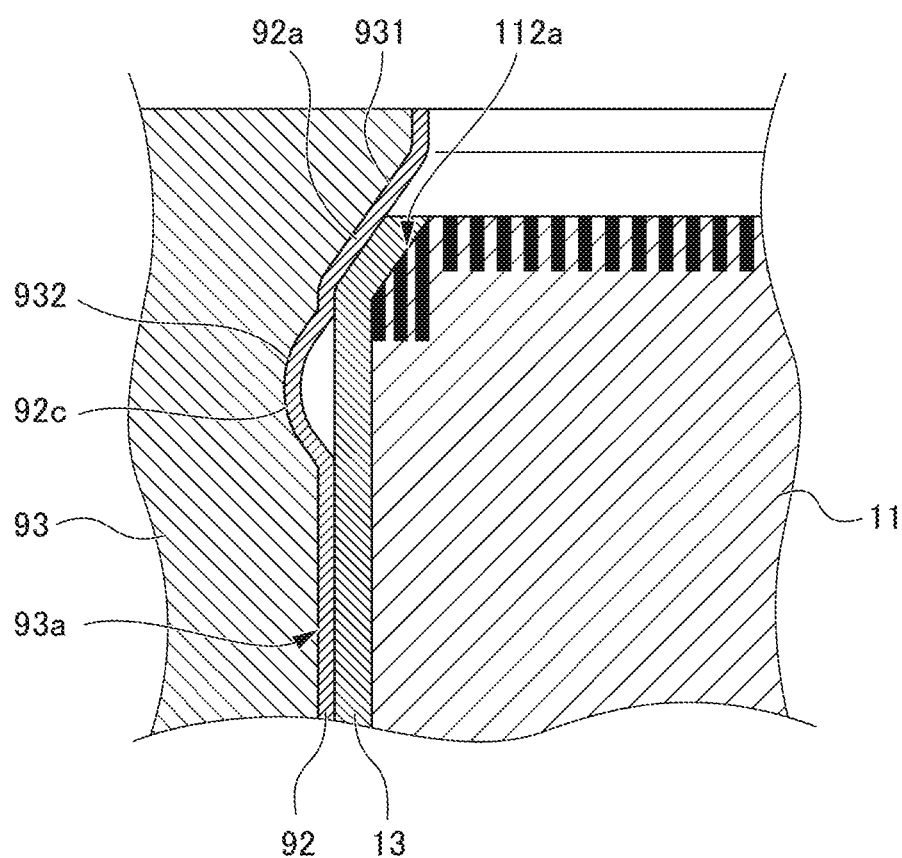
FIG. 15 is a cross-sectional view showing an aspect of forming a case sloped part of the exhaust gas purifying device according to the ninth embodiment of the present invention by way of press molding.

The housing step of the first method of manufacturing will be explained in further detail by referencing FIG. 15. Herein, FIG. 15 is a cross-sectional view showing an aspect of forming the case sloped parts 92*a*, 92*b* of the exhaust gas purifying device 9 according to the present embodiment by way of press molding. Although FIG. 15 shows only the case sloped part 92*a*, this similarly applies also for the case sloped part 92*b*. In the first method of manufacturing as shown in FIG. 15, a die 93 in which a die sloped part 931 of a shape following the sloped part 112*a* of the honeycomb carrier 11, and a recessed part 932 that extends in the circumferential direction are formed on the die surface 93*a* side of both ends in the center axis X direction of the honeycomb carrier 11, is used in the press molding of the case member 92.

More specifically, first, a plurality of the above-mentioned dies 93 is arranged in a ring so as to enclose the cylindrical case member. In other words, the dies 93 are a split mold that is divided in the circumferential direction. Next, the case member is pressed from the exterior side by causing this plurality of dies 93 to simultaneously move towards the inner side in the radial direction of the honeycomb carrier 11. When this is done, the convex part 92*c* is formed simultaneously with the case sloped part 92*a* being formed. At this time, the material flowing upon molding the case sloped part 92*a* flows into the convex part 92*c*. By intentionally guiding the material that flows during press molding into the convex part by way of forming the convex part 92*c* in the vicinity of the case sloped part 92*a* in this way, it is possible to avoid wrinkles, etc. from generating in the case sloped parts 92*a*, 92*b*, and it is made so that high molding (dimensional) precision of the case sloped parts 92*a*, 92*b* is obtained.

Next, a second method of manufacturing of the exhaust gas purifying device 9 according to the present embodiment will be explained. The second method of manufacturing of the exhaust gas purifying device 9 according to the present embodiment differs from the first embodiment only in the housing step, similarly to the first method of manufacturing. In the housing step of the present embodiment, similarly to the first method of manufacturing, the honeycomb carrier 11 around which the retaining member 13 is wrapped on the entire circumference over the entirety of the outer circumferential side thereof is inserted into the cylindrical case member prior to forming the case sloped parts 92a, 92b. Next, by pressing from the exterior side thereof to diameter reduce by spin molding rather than press molding both ends in the center axis X direction of the case member 92, the case sloped parts 92a, 92b and convex parts 92c, 92c are famed. The case member 92 having the case sloped parts 92a, 92b and the convex parts 92c, 92c is thereby produced.

Figure 16:
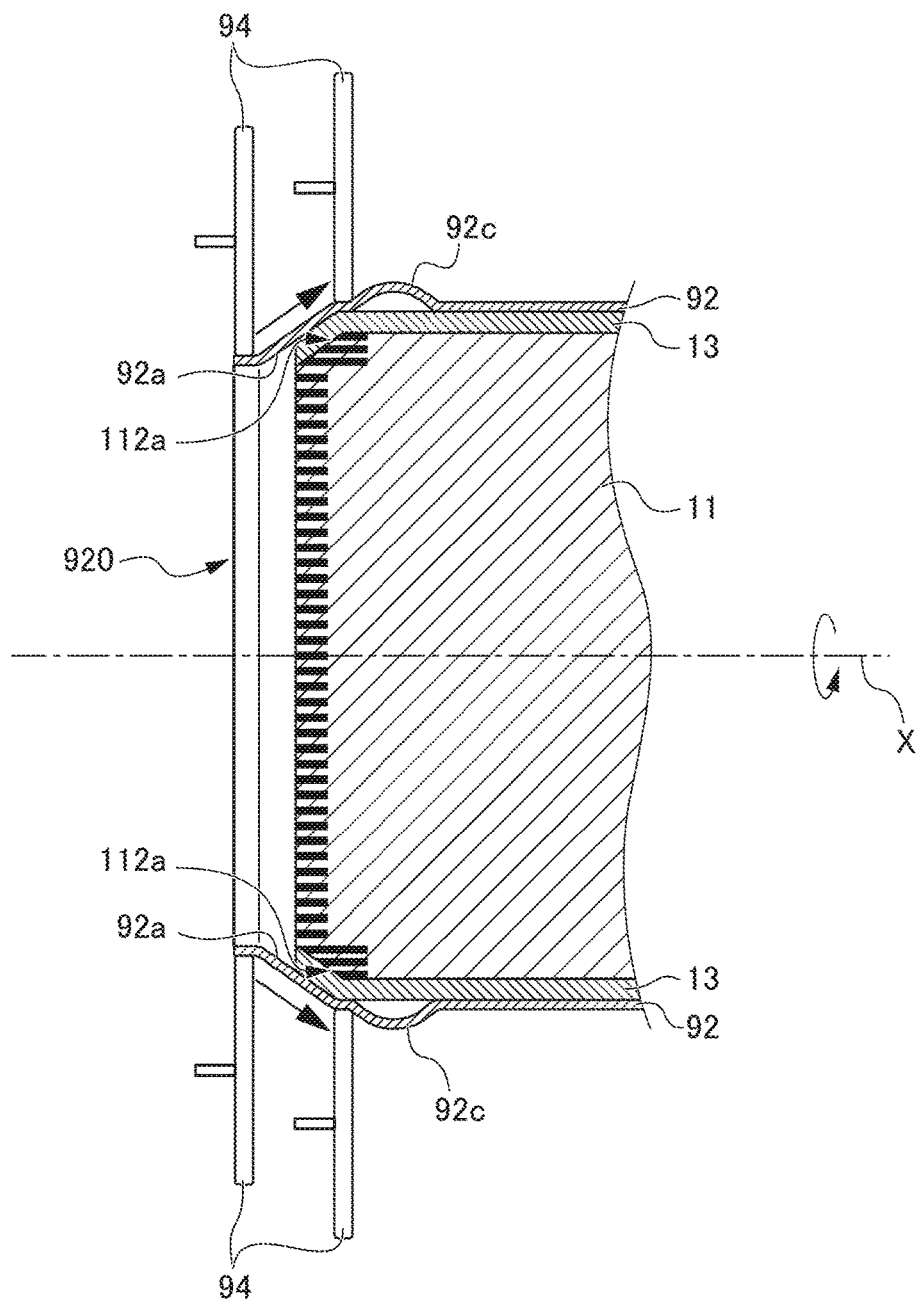
FIG. 16 is a cross-sectional view showing an aspect of forming a case sloped part and convex part of the exhaust gas purifying device according to the ninth embodiment of the present invention by spin molding.

The housing step in the second method of manufacturing will be explained in further detail by referencing FIG. 16. Herein, FIG. 16 is a cross-sectional view showing an aspect of forming the case sloped parts 92a, 92b and the convex parts 92c, 92c of the exhaust gas purifying device 9 according to the ninth embodiment of the present invention by way of spin molding. The second method of manufacturing as shown in FIG. 16 uses, in the spin molding of the case member 92, a spin molding device including a rotation mechanism (not illustrated) that causes the cylindrical case member housing the honeycomb carrier 11 inside to rotate with the center axis X thereof as the axis of rotation, and a plurality of rollers 94 for causing to plastically deform by pressing against the exterior of the case member. It should be note that, although rollers 94 are used in the spin molding device employed in the present embodiment, it may use paddles in place of the rollers 94.

More specifically, first, the cylindrical case member housing the honeycomb carrier 11 inside is made to rotate with the center axis X thereof as the axis of rotation by the rotation mechanism (not illustrated). At this time, if the opening end 920 of the case member is diameter reduced to a certain extent in advance, it is preferable because molding is easy. Next, a plurality (for example, 3) of the rollers 94 arranged so as to enclose the opening end 920 is pressed towards the radial-direction inner side against the exterior around the opening end 920 of the case member, in a state causing the above-mentioned case member to rotate.

Next, in a state pressing the rollers 94 with a fixed pressure force, the plurality of rollers 94 are made to simultaneously move towards the inner side in the center axis X direction (opposite side to opening end 920). In other words, the rollers 94 are made to move towards the outer circumferential side of the case member having larger diameter, from the opening end 920 of reduced diameter (refer to arrows in FIG. 16). When this is done, the case member pressed by the rollers 94 plastically deforms along the sloped part 112a of the honeycomb carrier 11, a result of which the case sloped part 92a is formed. At the same time, large wrinkles generate from the excess material occurring by the material constituting the case member being drawn upon forming the case sloped part 92a, and the convex part 92c is ultimately formed from this wrinkle.

By intentionally forming the convex parts 92c, 92c in the vicinity of the case sloped parts 92a, 92b which do not influence the retaining function of the honeycomb carrier 11 in the above way, it is possible to avoid wrinkles, etc. from generating at the case sloped parts 92a, 92b, and it is made so that high molding (dimensional) precision of the case sloped parts 92a, 92b is obtained.

Tenth Embodiment

An exhaust gas purifying device 10 according to a tenth embodiment of the present invention is the same configuration as the ninth embodiment, except for the configuration of a convex part 102c of a case member 102 differing compared to the exhaust gas purifying device 9 according to the ninth embodiment. Hereinafter, the configuration of the convex part 102c of the case member 102 will be explained by referencing FIG. 17. Herein, FIG. 17 is a perspective view of the exhaust gas purifying device 10 of an internal-combustion engine according to the present embodiment.

Figure 17:
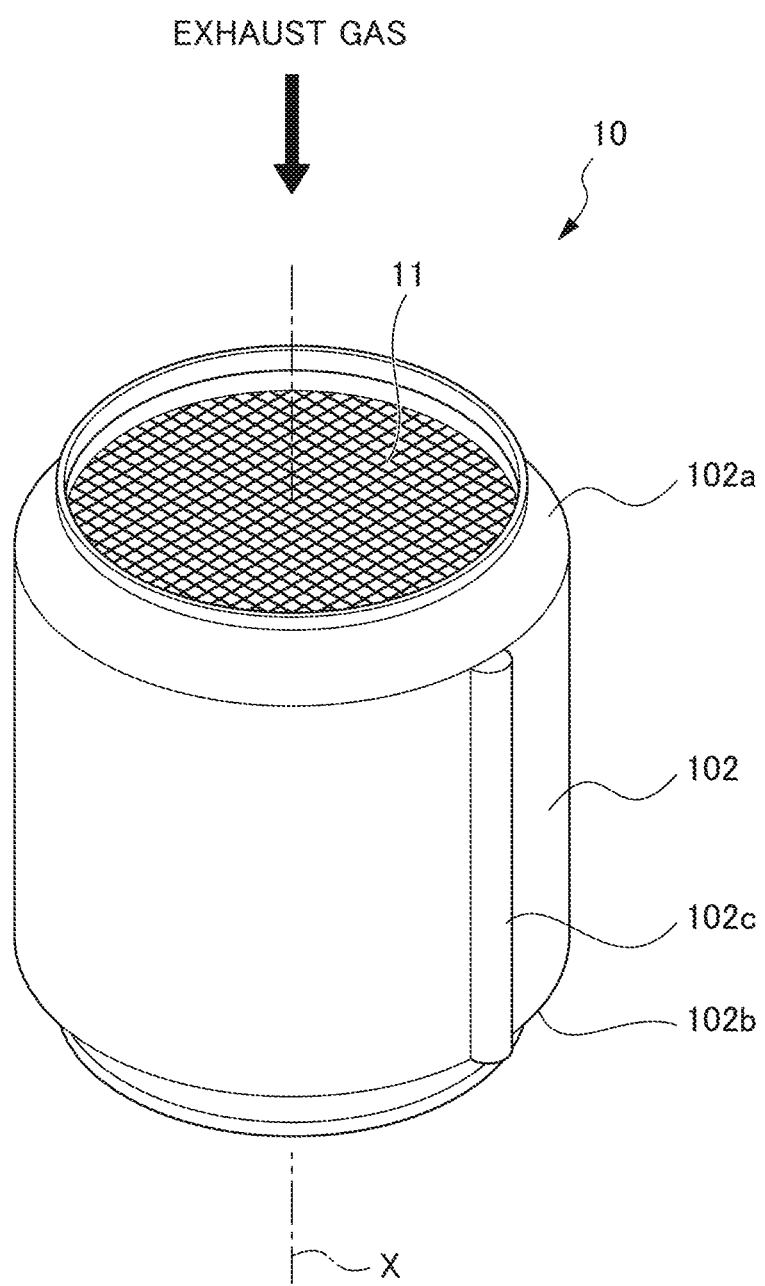
FIG. 17 is a perspective view of an exhaust gas purifying device of an internal-combustion engine according to a tenth embodiment of the present invention.

As shown in FIG. 17, the convex part 102c of the case member 102 according to the present embodiment differs from the ninth embodiment in the point of being famed to extend in the center axis X direction, contrary to the convex part 92c of the ninth embodiment, which extends in the circumferential direction. It should be noted that, although only one of the convex parts 102c is famed in the present embodiment, a plurality may be famed to be separated from each other in the circumferential direction.

As shown in FIG. 17, the convex part 102c is formed to extend from one case sloped part 102a until the other case sloped part 102b, and until the vicinity of the case sloped parts 92a, 92b of the case member 102. In addition, the convex part 102c is famed to project form the exterior of the case member 102 to the outer side so that the interior thereof becomes convex to the outer side, similarly to the convex part 92c of the ninth embodiment.

Next, a first method of manufacturing the exhaust gas purifying device 10 according to the present embodiment will be explained. The first method of manufacturing the exhaust gas purifying device 10 according to the present embodiment is the same compared to the first method of manufacturing of the ninth embodiment, except for the configuration of the die used in the housing step differing. More specifically, the die used in the housing step of the first method of manufacturing according to the present embodiment has a die sloped part of a shape formed at the die surface side on both ends in the center axis X direction and following the sloped part 112a of the honeycomb carrier 11, and a recessed part that is famed in the die surface side to straddle between the die sloped parts at both ends and extending in the center axis X direction, and uses a plurality of dies of a split mold divided in the circumferential direction. It is thereby possible to form the convex part 102c extending in the center axis X direction, and similar effects as the ninth embodiment are exerted.

Next, a second method of manufacturing the exhaust gas purifying device 10 according to the present embodiment will be explained. The second method of manufacturing the exhaust gas purifying device 10 according to the present embodiment is the same compared to the aforementioned first method of manufacturing according to the present embodiment, except for the configuration of the die used in the housing step differing. More specifically, the die used in the housing step of the second method of manufacturing according to the present embodiment is a die of a split mold in which a recessed part is not formed in the die surface, and is arranged to configure so that a somewhat large gap is formed at a part in the circumferential direction upon arranging a plurality of these dies in a ring aligning in the circumferential direction. Material that flows during press molding thereby flows into this gap, a result of which it is possible to form the convex part 102c.

Therefore, according to the present embodiment, by forming the convex part 102c in the vicinity of the case sloped parts 102a, 102b similarly to the ninth embodiment, it is possible to guide the material that flows during press molding into the convex part 102c intentionally. By forming the convex part 102c in the vicinity of the case sloped parts 102a, 102b which do not influence the retaining function of the honeycomb carrier 11, it is thereby possible to avoid wrinkles, etc. from generating at the case sloped parts 102a, 102b, and high molding (dimensional) precision of the case sloped parts 102a, 102b is obtained.

It should be noted that the present invention is not to be limited to the above-mentioned embodiments, and that modifications and improvements within a scope that can achieve the objects of the present invention are also included in the present invention.

In all of the above-mentioned embodiments, the present invention is applied to a filter (GPF) that is arranged in an exhaust pipe of a gasoline engine and collects PM in the exhaust gas; however, it is not limited thereto. For example, the present invention may be applied to a filter (DPF) that is arranged in the exhaust pipe of a diesel engine and collects PM in the exhaust gas. In this case, since the exhaust temperature of a diesel engine is low compared to a gasoline engine, a PM combustion catalyst that promotes combustive removal of PM may be loaded on the DPF instead of the three-way catalyst. As the PM combustion catalyst, an Ag-based PM combustion catalyst containing Ag is preferably used from the viewpoint of being able to combustively remove PM at the lowest temperature.

In addition, in all of the above-mentioned embodiments, the present invention is applied to a honeycomb carrier consisting of Cd; however, it is not limited thereto. For example, the present invention may be applied to a honeycomb carrier consisting of SiC, silica, alumina titanate, or the like.

In addition, in all of the above-mentioned embodiments, sloped parts are provided having a sloping plane that slopes in the direction in which the length in the center axis direction of the outer circumferential sealed part becomes smaller as approaching the outer circumferential edge side thereof; however, it is not limited thereto. For example, it may be configured as a sloped part having a sloping curved surface that slopes in the direction in which the length in the center axis direction becomes shorter as approaching the outer circumferential edge side thereof, and may be configured as a stepped part in the direction in which the length in the center axis direction becomes shorter as approaching the outer circumferential edge side thereof.

In addition, in all of the above-mentioned embodiments, the sealing depth of the outer circumferential sealed parts is all set to a predetermined depth; however, it is not limited thereto. For example, among the outer circumferential sealed parts, cells blocked by sealing agent from the exhaust inlet side to outlet side may be provided in a ring shape. Since loading the exhaust gas purifying catalyst on only the radial-direction central part in the catalyst loading step thereby becomes easy, catalyst leakage from the outer circumferential surface in the catalyst loading step, and exhaust leakage from the outer circumferential surface during use are more reliably prevented.

In addition, as in the above-mentioned eighth embodiment, the honeycomb carrier may be famed so as to have the vertical part also in the first to seventh embodiments.

Furthermore, the convex part of the case member of the above-mentioned ninth and tenth embodiments may be applied to any embodiments. Although one convex part is famed over the entire circumference in the vicinity of the case sloped part in the above-mentioned ninth embodiment, it is not limited thereto. For example, a plurality may be famed in the circumferential direction in the vicinity of the case sloped part. Similarly, although one convex part is famed so as to extend in the center axis direction in the tenth embodiment, it is not limited thereto. For example, a plurality of convex parts extending in the center axis direction may be formed to be separated from each other in the circumferential direction. In addition, both a convex part extending in the circumferential direction and a convex part extending in the center axis direction may be famed.

In addition, in all of the above-mentioned embodiments, the exhaust gas purifying device of so-called 1BED type that houses one honeycomb carrier is applied; however, it is not limited thereto. For example, an exhaust gas purifying device of so-called 2BED type that houses two honeycomb carriers arranged in-line in the exhaust flow direction may be applied. In particular, the conventional wrinkles tend to generate in the intermediate portion, etc. between the first bed and second bed; however, according to the above-mentioned ninth and tenth embodiments, this can be avoided.

EXPLANATION OF REFERENCE NUMERALS 1, 2, 3, 6, 7, 8, 9, 10 exhaust gas purifying device
11, 21, 31, 41, 51, 61, 71, 81 honeycomb carrier
12, 92, 102 case member
13 retaining member
92a, 92b, 102a, 102b case sloped part
92c, 102c convex part
110a, 210a, 310a, 510a, 610a, 710a, 810a end face in center axis X direction (exhaust gas inlet side end face)
110b, 210b, 310b, 510b, 610b, 710b, 810b end face in center axis X direction (exhaust gas outlet side end face)
111a, 111b, 211a, 211b, 311a, 311b, 411a, 411b, 511a, 511b, 611a, 611b, 711a, 711b, 811a, 811b outer circumferential sealed part
112a, 112b, 212a, 212b, 312a, 312b, 412a, 412b, 512a, 512b, 612a, 612b, 712a, 712b, 812a, 812b sloped part
813a, 813b vertical part
C radial-direction central part (central part)
Ca, Cb opening
D1 predetermined depth
P radial-direction outer circumferential part (outer circumferential part)
W, W1, W2 wall-flow part
X center axis

The invention claimed is:

1. An exhaust gas purifying device that is provided in an exhaust passage of an internal-combustion engine, and purifies exhaust gas of the internal-combustion engine, the device comprising:
a honeycomb carrier of columnar shape in which a plurality of cells extending from an exhaust gas inlet side end face until an outlet side end face to form flow paths of exhaust gas are demarcated and formed by porous separating walls;
an exhaust gas purifying catalyst that is loaded on the honeycomb carrier; and
a cylindrical case member that houses the honeycomb carrier via a retaining member,
wherein the honeycomb carrier includes an outer circumferential sealed part in which openings of cells at an outer circumferential part of at least one end face among both end faces in a center axis direction thereof are formed to be sealed to a predetermined depth, and a sloped part or stepped part formed in a direction in which the length in the center axis direction of the outer circumferential sealed part becomes smaller as approaching an outer circumferential edge side thereof, and wherein the honeycomb carrier is retained inside the case member by the sloped part or the stepped part in at least one end face catching on an inner wall of the case member via the retaining member.

2. The exhaust gas purifying device for an internal-combustion engine according to claim 1, wherein the honeycomb carrier is a filter having a wall-flow part in which openings of cells in a central part of both end faces in the center axis direction thereof are alternately sealed, and a cell having an opening on an exhaust inlet side sealed and a cell having an opening on the outlet side sealed are alternately adjacent, and wherein a sealing depth of the outer circumferential sealed part is deeper than a sealing depth of the central part.

3. The exhaust gas purifying device of an internal-combustion engine according to claim 2, wherein the exhaust gas purifying catalyst is loaded only on the wall-flow part.

4. The exhaust gas purifying device for an internal-combustion engine according to claim 1, wherein the honeycomb carrier is a filter having a wall-flow part in which openings of cells in a central part of both end faces in the center axis direction thereof are alternately sealed, and a cell having an opening on an exhaust inlet side sealed and a cell having an opening on the outlet side sealed are alternately adjacent, wherein an end face on an inner side in the center axis direction of sealing of the outer circumferential sealed part, and an end face on an inner side in the center axis direction of sealing of a central part of the one end face have substantially the same position in the center axis direction, and wherein a sealing depth of a central part of the other end face in the center axis direction is shorter than a sealing depth of a central part at the one end face.

5. The exhaust gas purifying device of an internal-combustion engine according to claim 1, wherein the honeycomb carrier is a filter having a wall-flow part in which an opening area of cells in the outer circumferential sealed part is smaller than an opening area of cells at a central part of the one end face, the openings of cells at the central part of both end faces in the center axis direction thereof are alternately sealed, and a cell having an opening on the exhaust gas inlet side sealed and a cell having an opening on the outlet side sealed are alternately adjacent, and wherein the end face at an inner side in the center axis direction of sealing of the outer circumferential sealed part has a position in the center axis direction that is arranged more to the inner side in the center axis direction than the end face at an inner side in the center axis direction of sealing of the central part of the one end face.

6. The exhaust gas purifying device of an internal-combustion engine according to claim 1, wherein the honeycomb carrier is a filter having a wall-flow part in which openings of cells at both end faces in the center axis direction thereof are alternately sealed, and a cell having an opening on an exhaust gas inlet side sealed and a cell having an opening on an outlet side sealed are alternately adjacent, wherein the honeycomb carrier includes an outer circumferential sealed part in which openings of cells in an outer circumferential part of both end faces in the center axis direction thereof are formed to be alternately sealed to a predetermined depth, and a sloped part or stepped part formed in a direction in which the length in the center axis direction of the outer circumferential sealed part becomes smaller as approaching an outer circumferential edge side thereof, wherein the honeycomb carrier is retained within the case member by the sloped part or stepped part of the end face on the exhaust gas outlet side catching against an inner wall of the case member via the retaining member, and wherein the retaining member is not interposed between the case member and the sloped part or stepped part at the end face on the exhaust gas inlet side.

7. The exhaust gas purifying device of an internal-combustion engine according to claim 6, wherein the exhaust gas purifying catalyst is loaded more abundantly on a wall-flow part at the central part in the center axis direction of the honeycomb carrier than a wall-flow part at the outer circumferential part in the center axis direction of the honeycomb carrier.

8. The exhaust gas purifying device of an internal-combustion engine according to claim 1, wherein the honeycomb carrier is a filter having a wall-flow part in which openings of cells at both end faces in the center axis direction thereof are alternately sealed, and a cell having an opening on an exhaust gas inlet side sealed and a cell having an opening on an outlet side sealed are alternately adjacent, wherein the honeycomb carrier includes an outer circumferential sealed part in which openings of cells in an outer circumferential part of both end faces in the center axis direction thereof are formed to be alternately sealed to a predetermined depth, and a sloped part or stepped part formed in a direction in which the length in the center axis direction of the outer circumferential sealed part becomes smaller as approaching an outer circumferential edge side thereof, wherein the honeycomb carrier is retained within the case member by the sloped part or stepped part of the end face on the exhaust gas inlet side catching against an inner wall of the case member via the retaining member, and wherein the retaining member is not interposed between the case member and the sloped part or stepped part at the end face on the exhaust gas outlet side.

9. The exhaust gas purifying device of an internal-combustion engine according to claim 1, wherein the honeycomb carrier has a vertical part that is perpendicular to both end faces and links the sloped part or stepped part with an outer circumferential edge of both end faces in the center axis direction.

10. The exhaust gas purifying device of an internal-combustion engine according to claim 1, wherein the sloped part or stepped part is formed by grinding or cutting a part of the outer circumferential sealed part.

11. The exhaust gas purifying device of an internal-combustion engine according to claim 1, wherein the case member includes:

a case sloped part or a case stepped part that is formed to follow the sloped part or stepped part of the honeycomb carrier, and a convex part that is formed in a vicinity of the case sloped part or the case stepped part, and an interior thereof projects towards an outer side.

12. A method of manufacturing an exhaust gas purifying device of an internal-combustion engine, the method comprising the steps of:
sealing to form, in a columnar honeycomb carrier in which a plurality of cells forming flow paths of exhaust gas that extend from an exhaust gas inlet side end face until an outlet side end face are demarcated and formed by porous separating walls, an outer circumferential sealed part by sealing openings of cells in an outer circumferential part of at least one end face among both end faces in a center axis direction thereof to a predetermined depth;
machining to form a sloped part or a stepped part in a direction in which a length in the center axis direction of the outer circumferential sealed part becomes smaller as approaching an outer circumferential edge side thereof, by grinding or cutting a part of the outer circumferential sealed part;
catalyst loading to load an exhaust gas purifying catalyst onto the honeycomb carrier in which the sloped part or the stepped part was formed; and
housing the honeycomb carrier on which the exhaust gas purifying catalyst was loaded within the case member so as to be retained by the sloped part or the stepped part catching against an inner wall of a cylindrical case member via a retaining member.

13. The method of manufacturing an exhaust gas purifying device of an internal-combustion engine according to claim 12, wherein the honeycomb carrier is further made into a filter having a wall-flow part in which a cell having an opening on an exhaust gas inlet side sealed and a cell having an opening on an outlet side sealed are adjacent, by alternately sealing openings of cells in a central part of both end faces in a center axis direction of the honeycomb carrier to a depth shallower than the outer circumferential sealed part, in the step of sealing.

14. The method of manufacturing an exhaust gas purifying device of an internal-combustion engine according to claim 13, wherein the exhaust gas purifying catalyst is loaded only on the wall-flow part in the step of catalyst loading, by immersing a side of the one end face of the honeycomb carrier into a slurry containing the exhaust gas purifying catalyst in a state sealing an outer circumferential part of the one end face, and then suctioning from a central part of the other end face.

15. The method of manufacturing an exhaust gas purifying device of an internal-combustion engine according to claim 14, wherein a sealing depth of a central part at the one end face of the honeycomb carrier is made substantially equal to a sealing depth of the outer circumferential sealed part, and a sealing depth of a central part at the other end face is made shorter than a sealing depth of a central part at the one end face, in the step of sealing.

16. The method of manufacturing an exhaust gas purifying device of an internal-combustion engine according to claim 13, wherein a honeycomb carrier in which an opening area of cells in the outer circumferential part at both end faces in the center axis direction is smaller than an opening area of cells in a central part thereof is used as the honeycomb carrier, and an end face on an inner side in the center axis direction of sealing of the outer circumferential sealed part is sealed so as to be disposed more to the inner side in the center axis direction than an end face on an inner side in the center axis direction of sealing of the central part at the one end face, in the step of sealing.

17. The method of manufacturing an exhaust gas purifying device of an internal-combustion engine according to claim 12, wherein a honeycomb carrier on which the exhaust gas purifying catalyst was loaded is housed in the step of housing so as to be retained within a case member having a case sloped part or a case stepped part that follows the sloped part or the stepped part of the honeycomb carrier, and a convex part that is formed in a vicinity of the case sloped part or the case stepped part and having an interior that projects to an outer side, by the sloped part or the stepped part catching against an inner wall of the case sloped part or the case stepped part via a retaining member.

* * * * *